United States Patent
Coffey et al.

(10) Patent No.: US 11,187,616 B2
(45) Date of Patent: Nov. 30, 2021

(54) OPTICAL POWER DETECTOR AND READER

(71) Applicant: COMMSCOPE TECHNOLOGIES LLC, Hickory, NC (US)

(72) Inventors: Joseph Christopher Coffey, Burnsville, MN (US); Steven C. Zimmel, Minneapolis, MN (US); Joseph Polland, Eden Prairie, MN (US); Morgan C. Kurk, Sachse, TX (US); Trevor D. Smith, Eden Prairie, MN (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 16/073,544

(22) PCT Filed: Jan. 27, 2017

(86) PCT No.: PCT/US2017/015410
§ 371 (c)(1),
(2) Date: Jul. 27, 2018

(87) PCT Pub. No.: WO2017/132549
PCT Pub. Date: Aug. 3, 2017

(65) Prior Publication Data
US 2019/0049337 A1  Feb. 14, 2019

Related U.S. Application Data

(60) Provisional application No. 62/288,296, filed on Jan. 28, 2016, provisional application No. 62/306,832,
(Continued)

(51) Int. Cl.
*G01M 11/00* (2006.01)
*G02B 6/38* (2006.01)
(Continued)

(52) U.S. Cl.
CPC .............. *G01M 11/30* (2013.01); *G02B 6/00* (2013.01); *G02B 6/385* (2013.01); *G02B 6/3825* (2013.01); *G02B 6/4286* (2013.01)

(58) Field of Classification Search
CPC ......... G01M 11/30; G02B 6/385; G02B 6/00; G02B 6/3825; G02B 6/4286
See application file for complete search history.

(56) References Cited

U.S. PATENT DOCUMENTS 4,103,154 A     7/1978   D'Auria et al.
4,787,706 A *  11/1988   Cannon, Jr. .......... G02B 6/3893
                                                          385/59

(Continued)

FOREIGN PATENT DOCUMENTS

WO    2012/112344 A1    8/2012
WO    2013/117598 A2    8/2013
(Continued)

OTHER PUBLICATIONS

International Search Report and Written Opinion of the International Searching Authority for International Patent Application No. PCT/US2017/015410 dated May 22, 2017, 20 pages.

*Primary Examiner* — Sang H Nguyen
(74) *Attorney, Agent, or Firm* — Merchant & Gould P.C.

(57) ABSTRACT

An optical power detection system comprises a sensor and a reader. The sensor is configured to detect light in the cladding of an optical fiber. The sensor is positioned both within a ferrule of the optical fiber and proximate the cladding. The sensor is additionally configured to produce an output signal representative of the detected light. The reader is electrically coupled to the sensor and is configured to receive the sensor output signal. The reader is additionally
(Continued)

configured to operation on the output signal to produce a corresponding visual and/or audible indication of the optical power in the optical fiber.

11 Claims, 16 Drawing Sheets

Related U.S. Application Data filed on Mar. 11, 2016, provisional application No. 62/316,759, filed on Apr. 1, 2016.

(51) Int. Cl.
*G02B 6/42* (2006.01)
*G02B 6/00* (2006.01)

(56) References Cited

U.S. PATENT DOCUMENTS

| | | | |
|---|---|---|---|
| 4,822,997 A * | 4/1989 | Fuller | G07C 3/00 250/227.11 |
| 5,086,378 A * | 2/1992 | Prince | F21V 21/08 362/103 |
| 5,708,265 A | 1/1998 | Poole | |
| 5,963,695 A * | 10/1999 | Joyce | G02B 6/4236 385/88 |
| 6,612,751 B1 * | 9/2003 | Watanabe | G02B 6/241 385/44 |
| 8,142,221 B2 | 3/2012 | Malstrom et al. | |
| 8,636,425 B2 | 1/2014 | Nhep | |
| 8,690,593 B2 | 4/2014 | Anderson et al. | |
| 8,870,466 B2 * | 10/2014 | Lu | G02B 6/245 385/58 |
| 8,923,013 B2 | 12/2014 | Anderson et al. | |
| 8,934,252 B2 | 1/2015 | Anderson et al. | |
| 8,934,253 B2 | 1/2015 | Anderson et al. | |
| 9,020,319 B2 | 4/2015 | Anderson et al. | |
| 9,118,414 B2 | 8/2015 | Storey et al. | |
| 9,140,859 B2 | 9/2015 | Anderson et al. | |
| 9,176,294 B2 | 11/2015 | Smrha et al. | |
| 9,198,320 B2 | 11/2015 | Anderson et al. | |
| 9,213,363 B2 | 12/2015 | Anderson et al. | |
| 9,217,687 B2 * | 12/2015 | Orband | G01M 11/0207 |
| 9,223,105 B2 | 12/2015 | Anderson et al. | |
| 9,497,016 B2 * | 11/2016 | Suzuki | H04L 5/14 |
| 2008/0292250 A1 * | 11/2008 | Hino | G02B 6/4201 385/92 |
| 2008/0293290 A1 * | 11/2008 | Ku | H01R 13/7175 439/490 |
| 2010/0329604 A1 * | 12/2010 | Kojima | G02B 6/2852 385/31 |
| 2015/0084440 A1 | 3/2015 | Erdmann et al. | |
| 2015/0177463 A1 * | 6/2015 | Lee | G02B 6/387 385/76 |
| 2015/0265734 A1 * | 9/2015 | Horioka | A61N 5/0624 250/492.1 |
| 2015/0293311 A1 | 10/2015 | Coffey et al. | |
| 2016/0018605 A1 * | 1/2016 | Ott | G02B 6/3889 385/78 |
| 2016/0047989 A1 * | 2/2016 | Hallstein | G02B 6/29311 385/24 |
| 2017/0016697 A1 * | 1/2017 | Jones | F41G 1/345 |

FOREIGN PATENT DOCUMENTS

| | | |
|---|---|---|
| WO | 2014/099457 A2 | 6/2014 |
| WO | 2015/121804 A1 | 8/2015 |
| WO | 2016/043922 A1 | 3/2016 |
| WO | 2017/223072 A1 | 12/2017 |

* cited by examiner

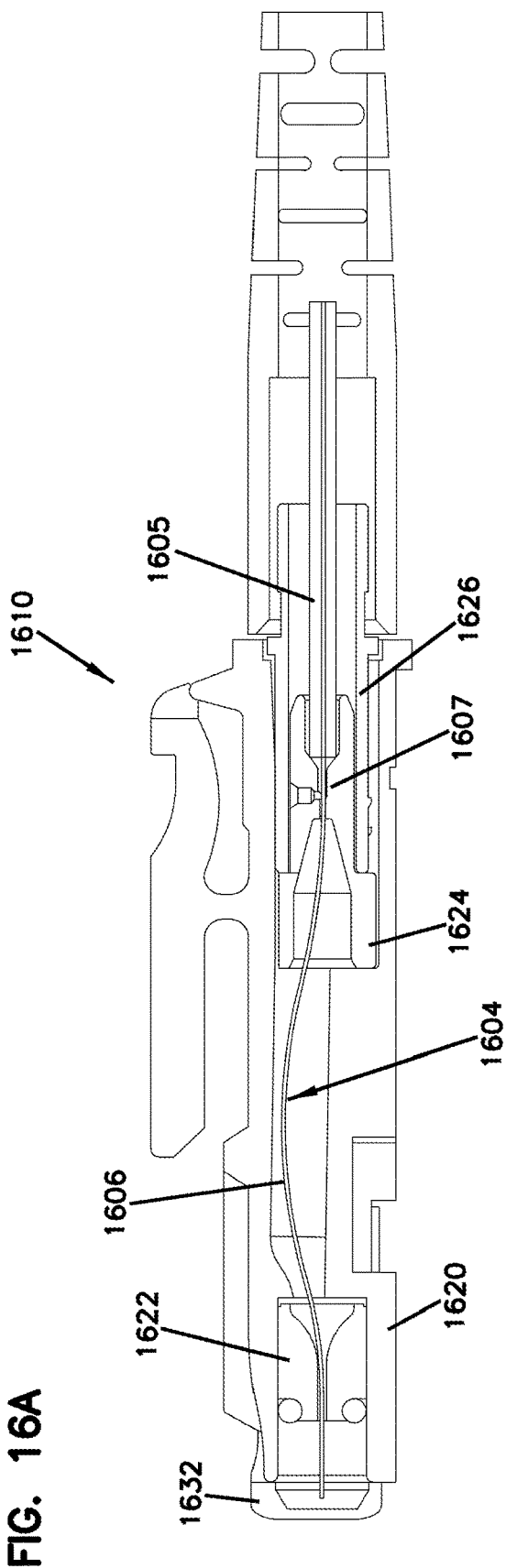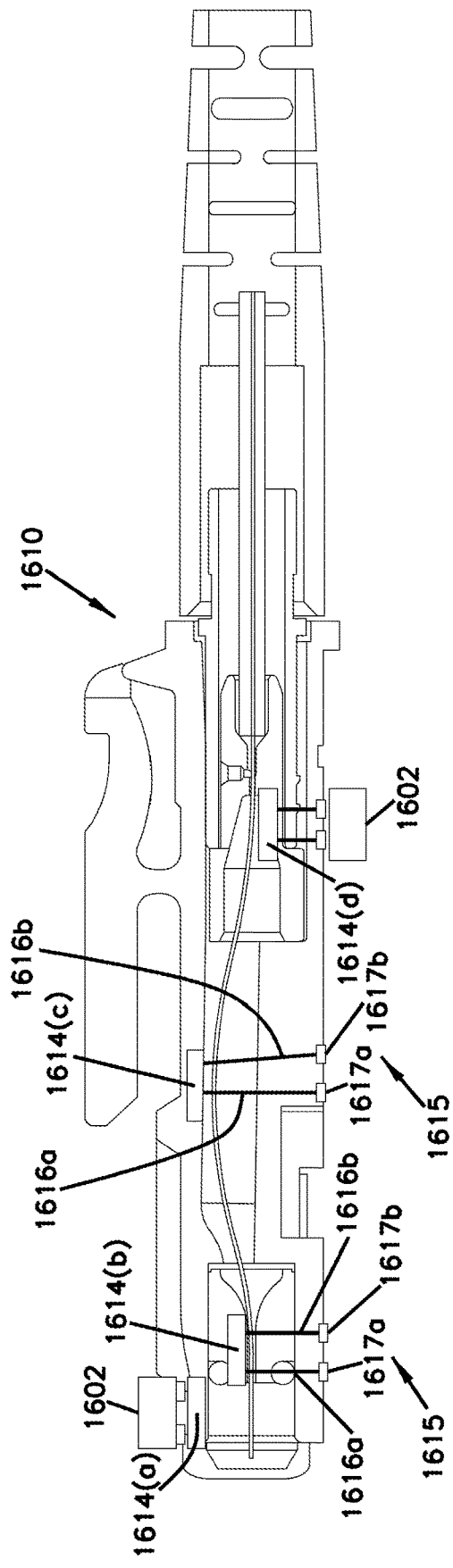

OPTICAL POWER DETECTOR AND READER

CROSS-REFERENCE TO RELATED APPLICATIONS

This application is a National Stage Application of PCT/US2017/015410, filed on Jan. 27, 2017, which claims the benefit of U.S. Patent Application Ser. No. 62/288,296, filed on Jan. 28, 2016, and claims the benefit of U.S. Patent Application Ser. No. 62/306,832, filed on Mar. 11, 2016, and claims the benefit of U.S. Patent Application Ser. No. 62/316,759, filed on Apr. 1, 2016, the disclosures of which are incorporated herein by reference in their entireties. To the extent appropriate, a claim of priority is made to each of the above disclosed applications.

BACKGROUND OF THE DISCLOSURE

Various types of tests are currently available for testing the power of an optical fiber in a fiber optic cable. These tests range from very simple to very sophisticated. For example, the "flashlight" test is perhaps the simplest test. It requires disconnecting the cable at both ends, then shining a visible light source, e.g. a flashlight, into one end of the optical fiber then checking to see if the light has traveled to the other end of the optical fiber. This type of test does not tell how much light is lost in the optical fiber or where a fault might be located within the fiber.

Another type of test that may be performed on an optical fiber is an attenuation test. This test indicates how much light is actually lost within the optical fiber. To perform the attenuation test, each end of the fiber optic cable is disconnected and then coupled between a light source of known intensity and an optical power meter. Upon transmission of the light from the light source, the optical power meter is able to detect the amount of light transmitted through the optical fiber. The difference between the known intensity and the measurement of the optical power meter indicates the loss, or attenuation, of the optical fiber.

Still another test for fiber optic power detection is optical time domain reflectometer (OTDR) testing. The reflectometer is a device that sends a short pulse of energy into a fiber optic cable and measures how much of that energy is reflected back to it. The time domain reflectometer displays the results of the reflected energy relative to the amount of time elapsed between when the pulse is sent and when the reflections are received. Viewing the amount of reflected light received over time can help to determine where a break in an optical fiber may have occurred.

While each of the above tests can provide valuable information about fiber optic power, each requires the disconnection of the fiber optic cable from its working environment.

SUMMARY

In general terms, this disclosure is directed to systems and methods for determining the optical power of an optical fiber.

In one aspect, the systems and methods are configured to utilize a detector and a reader. The detector is positioned both within a ferrule of the optical fiber and proximate the cladding of the optical fiber in an orientation parallel to the axis of the optical fiber. The ferrule is at least partially contained within a housing that may comprise a connector (e.g. an LC or SC connector), a converter, or an adapter. The light detected by the detector is converted to a representative electrical signal and transmitted to the reader, which is electrically coupled to the detector. Upon receiving the signal, the reader operates on the signal by boosting its level, converting it to a digital signal, and submitting the digital signal to a microcontroller contained therein. The microcontroller is configured to execute programmed instructions causing it to operate on the digital signal and produce an output signal representative of the optical power in the optical fiber. The optical power signal may then be used to activate an indicator or display of the reader, or the signal may be transmitted to remote device via wireless transmission. The microcontroller may additionally be programmed to determine an optical power level in the optical fiber, a wavelength of the light in the optical fiber, and/or a direction of transmission of the light in the optical fiber. The detector and reader may be configured to be powered by an energy harvesting device. The power detection may be performed non-intrusively, e.g., without having to remove the optical fiber from its normal working environment.

One aspect of the disclosure is directed to an optical power detection system comprising a sensor and a reader. The sensor is configured to detect light in the cladding of an optical fiber. The sensor is positioned both within a ferrule of the optical fiber and proximate the cladding. The sensor is additionally configured to produce an output signal representative of the detected light. The reader is electrically coupled to the sensor and is configured to receive the sensor output signal. The reader is additionally configured to operate on the output signal to produce a corresponding visual and/or audible indication of the optical power in the optical fiber.

Another aspect of the disclosure is directed to a method for detecting optical power. The method comprises: (a) detecting light from a cladding of an optical fiber from a position both within a ferrule of the optical fiber and proximate the cladding; (b) producing a first signal representative of the detected light; (3) receiving the first signal and operating on the first signal to produce a corresponding second signal representative of the optical power in the optical fiber; and transmitting the second signal to activate an audio and/or visual indicator to indicate the optical power.

Another aspect of the disclosure is directed to an optical power detection system comprising a housing, a photodetector, and a reader. The photodetector is contained within the housing and is configured to detect light in a cladding of an optical fiber. The optical fiber is at least partially contained within the housing. The photodetector is positioned both within a ferrule of the optical fiber and proximate the cladding. Further, the photodetector is oriented parallel to the axis of the optical fiber. The photodetector is configured to produce a first output signal representative of the detected light. The reader is electrically coupled to the photodetector and includes a microcontroller. The reader is configured to receive the first output signal while the microcontroller is configured to execute program instructions causing the reader to perform: (a) operating on the first output signal to produce a corresponding second output signal representative of the optical power in the optical fiber; and (b) transmitting the second signal to activate an audio and/or visual indicator to indicate the optical power.

Still another aspect of the disclosure is directed to a light sensing unit adapted to be mounted at a subscriber location. The light sensing unit includes a first port, a second port, a light sensor, and a push button energy harvesting device. The first port is adapted to receive a connectorized end of a first optical fiber coupled to a service provide location. The second port is adapted to receive a connectorized end of a second optical fiber routed into the subscriber location, wherein the connectorized ends of the first and second optical fibers are optically coupled when inserted in the first and second ports. The light sensor is adapted to detect whether an optical signal is being provided from the service provider through the first fiber. The push button energy harvesting device is adapted to power the light sensor.

Still another aspect of the disclosure is directed to an optical power detection system having an optical fiber housing, a sensor and a processing device. The optical fiber housing is adapted to at least partially surround an end of an optical fiber. The sensor is protected by the housing, and is adapted to detect light in a cladding of the optical fiber produce a sensor output representative of the detected light. The processing device is embedded within the housing and is electrically coupled to the sensor. The processing device is adapted to receive the sensor output and generate a processor output based on the sensor output that is representative of the detected light. The processing output can be provided to a managed connectivity system and/or can be used to operate an LED to provide an indication of the presence or absence of detected light at the sensor.

Still another aspect of the disclosure is directed to an optical power detection system comprising a ferrule-less connector, an optical fiber and a sensor. The optical fiber extends through the ferrule-less connector and includes a bare fiber portion that includes a mirror to direct light laterally from a cladding of the optical fiber. The sensor detects the laterally directed light.

Still another aspect of the disclosure is directed to an optical power detection system comprising a sensor and a reader. The sensor is configured to detect light in the cladding of an optical fiber. The sensor is positioned over an opening within a connector wherein the opening overlies a bare fiber portion of the optical fiber. The sensor is additionally configured to produce an output signal representative of the detected light. The reader is coupled to the sensor and is configured to receive the sensor output signal. The reader is additionally configured to operate on the output signal to produce an output representative of the amount of power in the optical fiber.

The above summary is not intended to describe each embodiment or every implementation. A more complete understanding will become apparent and appreciated by referring to the following detailed description and claims in conjunction with the accompanying drawings.

DESCRIPTION OF THE DRAWINGS

FIG. 16A is cross-section of a ferrule-less optical fiber connector.

FIG. 16B is the ferrule-less optical fiber connector of FIG. 16A including an optical power detector and reader.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure is directed to an optical power detector and reader. In certain embodiments, the optical power detector includes a photodetector positioned within a ferrule that substantially surrounds the cladding of an optical fiber; a housing is provided about the ferrule. The photodetector is provided with an electrical interface, optionally via the housing, that enables the photodetector to be electrically coupled to the reader, which is provided with a cooperative electrical interface. Upon electrical coupling of the power detector and the reader, the photodetector is configured to detect light in the optical fiber and transmit a signal representative of the detected light to the reader. The reader utilizes the transmitted signal to determine a presence and/or level of optical power in the optical fiber. In certain embodiments, the housing or connector is provided about a ferrule-less optical fiber with the photodetector mounted on or within the housing/connector and positioned proximate the core and/or the cladding of the optical fiber from which the photodetector may detect light; the photodetector then transmits a signal representative of the detected light to the reader. In certain embodiments, the connector includes an opening providing optical access to an underlying optical fiber from which light can be detected by a remotely located photodetector whose signal can be transmitted to the reader.

Figure 1:
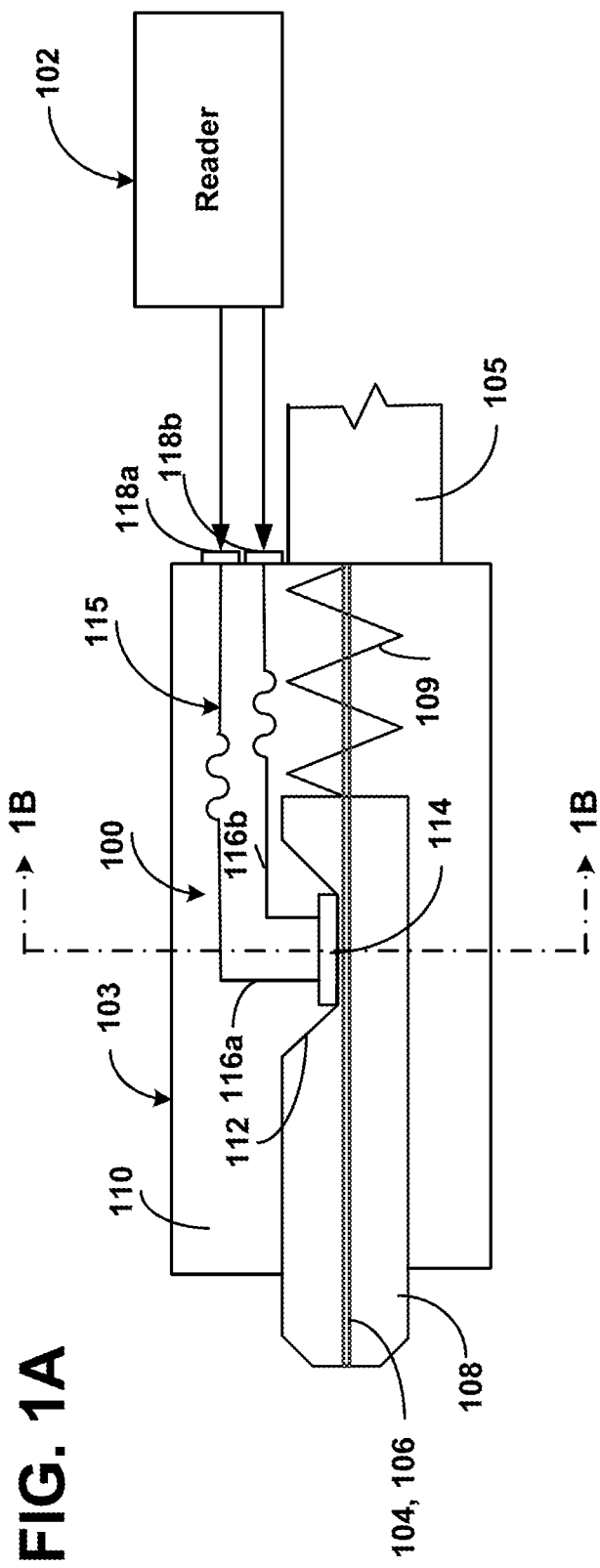
FIG. 1A is a schematic of an example embodiment of a ferrule-based optical power detector and reader in a connector configuration.
FIG. 1B is a cross-sectional view taken along line B-B in FIG. 1A.

FIG. 1A provides an example embodiment of a ferrule-based optical power detector 100 and a reader 102 in a connector 103 configuration. The detector 100 generally comprises an optical fiber 104, a ferrule 108, a housing 110, a photodetector 114, and an electrical interface 115. As shown, the optical fiber 104, which extends from an optical fiber cable 105, includes optical cladding 106 about an optical core 107 (see FIG. 1B). The ferrule 108 surrounds the cladding 106 and is biased in a forward direction by a spring 109, which allows the ferrule 108 to move relative to the housing 110 along a longitudinal axis. The housing 110 is provided about the ferrule 108. In one example embodiment, the housing 110 comprises a connector body of an LC connector. In another example embodiment, the housing 110 comprises a connector body and release sleeve of an SC connector. Other housing configurations may be used without departing from the spirit or scope of the disclosure.

A cavity 112, or groove, is etched or otherwise fabricated within the ferrule 108 to expose a portion of the cladding 106. Seated within the cavity 112, over the exposed portion of the cladding 106, is the photodetector 114. In one example embodiment, the photodetector 114 comprises a positive-intrinsic-negative (PIN) photodiode that is used to detect optical energy. Alternatively, other types of sensors may be used within the ferrule 108 to detect other types of physical energy and produce a usable output signal representative of that physical energy. However, in the context of the photodetector embodiment, the photodetector 114 is fixedly secured within the cavity 112 in a position substantially parallel to the axis of the optical fiber 104. Further, the photodetector 114 is configured to be electrically coupled to the reader 102 via the electrical interface 115. In one example embodiment, the electrical interface 115 comprises a pair of electrical leads 116a and 116b extending from the photodetector 114 to contacts 118a and 118b fixed on the outside of the housing 110. In another example embodiment, the electrical leads 116a, 116b are provided with slack, as shown in FIG. 1A, to accommodate the motion of the ferrule 108 as it travels longitudinally. The slack may, alternatively, be replaced with springs, slides or any type of electrical connection that would accommodate movement between the ferrule 108 and the housing 110. The fixed contacts 118a and 118b provide an easily accessible access point for quickly coupling and decoupling the independent reader 102.

Figure 2:
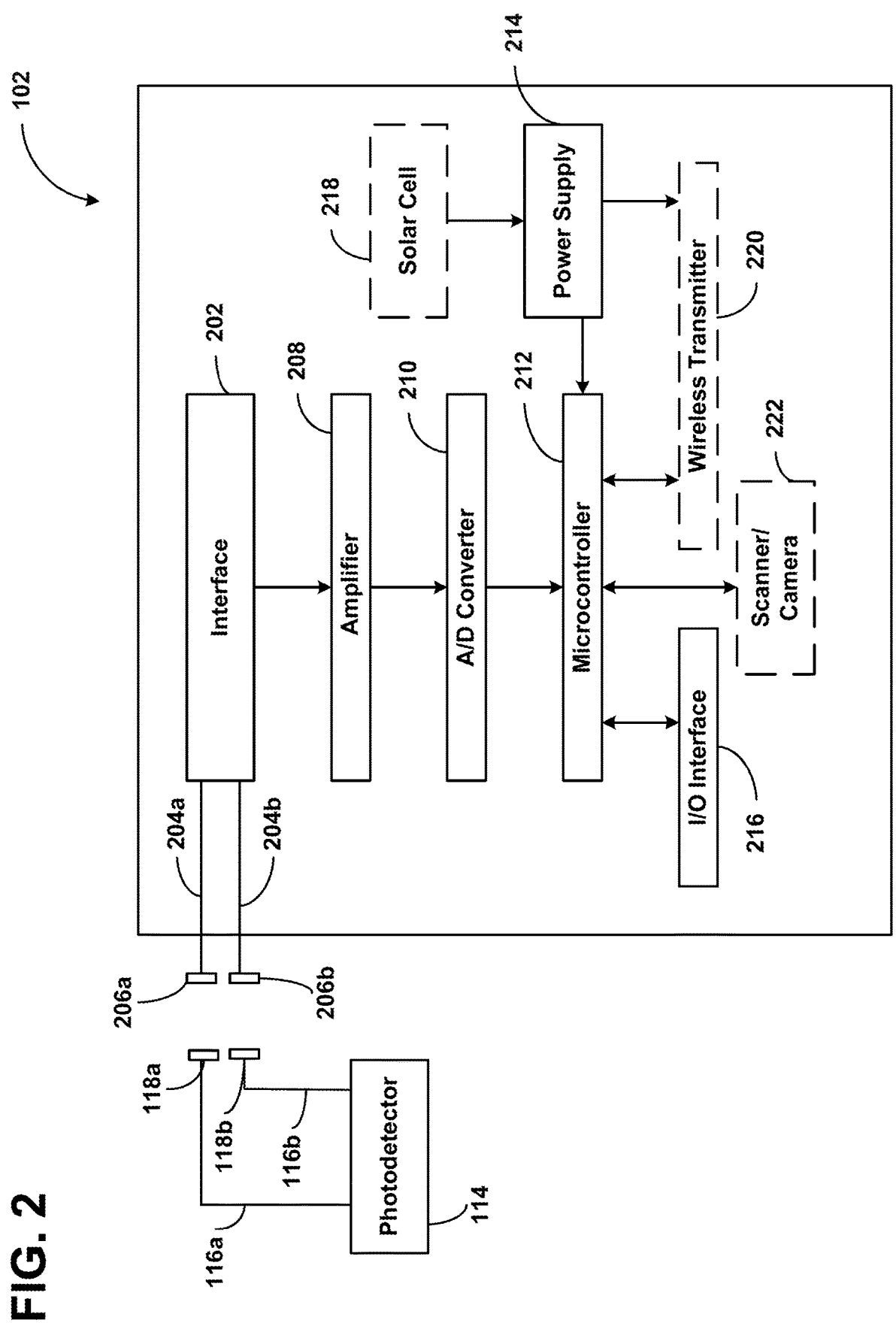
FIG. 2 is a schematic of an example embodiment of an optical power reader.

The reader 102, shown in further detail in FIG. 2, generally includes an electrical interface 202, an amplifier 208, an analog-to-digital (A/D) converter 210, a microcontroller 212, a power supply 214 and an I/O interface 216. The electrical interface 202 enables the reader 102 to be electrically coupled to the photodetector 114. In one example embodiment, the electrical interface 202 includes leads 204a, 204b extending to contacts 206a, 206b which are configured to work in cooperation with contacts 118a, 118b. The output of the photodetector 114 is received through the electrical interface 202 and is provided to the amplifier 208.

The amplifier 208 boosts the output signal from the photodetector 114 to a more usable level. In one example embodiment, the amplifier 208 comprises a transimpedance amplifier that is configured to boost the signal from the photodetector 114 and convert the photodetector's current output to a voltage. The analog output signal from the amplifier 208 is provided to the A/D converter 210, which converts the analog signal to a binary signal for submission to the microcontroller 212.

The power supply 214 provides the power for the microcontroller 212, the photodetector 114, as well as any outputs activated by the microcontroller 212 via the I/O interface 216. The outputs may include, but are not limited to, an LED indicator, an LCD display indicator or other type of indicator capable of indicating power in the optical fiber 104. In one example embodiment, the power supply 214 comprises a battery contained within the reader 102 itself for easy portability while in another example embodiment the power supply 214 is external to the portable reader 102. The reader 102 may include various other components to enhance its operation. For example, the reader 102 may include a solar cell 218, externally mounted on the reader 102, to charge a battery power supply 214. Further, the reader 102 may include a wireless transmitter (or transceiver) 220 for transmission of data related to the power detected at the optical fiber 104. The wireless transmissions may be in any known wireless technology but are particularly suited to short-range, low-power, low-maintenance, personal area networks like Bluetooth low energy (BLE), ZigBee, ANT, etc. The inclusion of camera or scanner 222 in the reader 102, e.g. for scanning a barcode, may also be beneficial.

In operation, light is transmitted through the optical fiber 104 while the optical fiber 104 is in its normal working environment. In one example embodiment, a normal working environment may find the optical fiber 104 connected, via housing 110, to a patch panel in a central office or data center. In another example embodiment, a normal working environment may find the optical fiber 104 connected, via housing 110, to a receptacle in a home. Regardless, as the light is transmitted through the fiber 104, a normal loss of light transmission into the cladding 106 occurs. Subsequently, upon electrically coupling the reader 102 to the power detector 100, the photodetector 114 is provided with sufficient power to detect any small amount light that has been lost into the cladding 106. The amount of light detected provides an indication of optical power in the optical fiber 104. A signal representative of this detected light is transmitted from the photodetector 114 to the reader 102, where the signal is amplified and converted to a binary signal.

The microcontroller 212 of the reader 102 is programmed to operate on the binary signal (e.g., a digital word) and produce an output representative of the detected optical power. In one example embodiment, the microcontroller 212 is configured to output an on/off indication through the lighting/non-lighting of an LED; other types of visible and/or audible indicators may be used to indicate an on/off status. In another example embodiment, the microcontroller 212 is configured to operate on the binary signal and produce detailed information about the actual power level detected, about the frequency at which the light is being transmitted (e.g. light transmitted at 1300 nm indicating a short range transmission; light transmitted at 1550 nm indicating a long range transmission), and/or about the direction of travel of the light, e.g. incoming/outgoing. In one example embodiment, the detailed information is displayed on an LCD screen housed by the reader 102. In another example embodiment, the detailed information is exported from the reader 102 by wired or wireless transmission to a data receiver, e.g., central computer, laptop computer, tablet, mobile device, etc.

Figure 3:
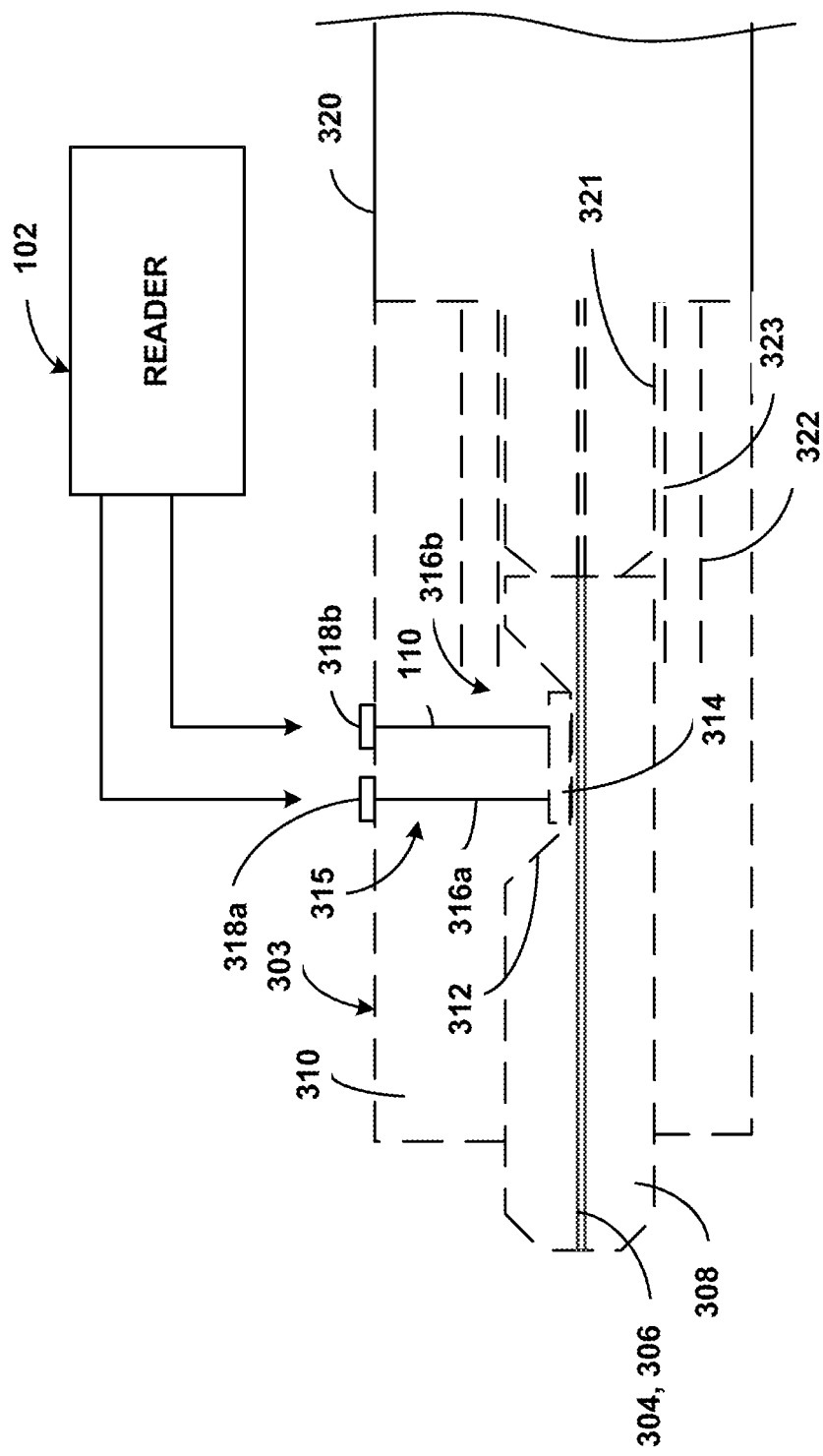
FIG. 3 is a schematic of an example embodiment of a ferrule-based optical power detector and reader in a converter configuration.

FIG. 3 provides an example embodiment of a ferrule-based optical power detector 300 and the reader 102 in a converter 303 configuration. The detector 300 generally comprises a section of optical fiber 304, which is independent from an optical fiber cable, a ferrule 308, a housing 310, a photodetector 314, and an electrical interface 315. The optical fiber 304 includes optical cladding 306 about an optical core (not shown). The ferrule 308 substantially surrounds the optical fiber 304 and the housing 310 is provided about the ferrule.

A cavity 312, or groove, is etched or otherwise fabricated within the ferrule 308 to expose a portion of the cladding 306. Seated within the cavity 312, over the exposed portion of the cladding 306, is the photodetector 314. In one example embodiment, the photodetector 314 comprises a positive-intrinsic-negative (PIN) photodiode. The photodetector 314 is fixedly secured within the cavity 312 in a position substantially parallel to the axis of the section of the optical fiber 304 and is configured to be electrically coupled to the reader 102 (see FIG. 2 and description above) via an electrical interface 315. In one example embodiment, the electrical interface 315 comprises a pair of electrical leads 316*a* and 316*b* extending from the photodetector 314 to contacts 318*a* and 318*b* fixed on the outside of the housing 310. The fixed contacts 318*a* and 318*b* provide an easily accessible access point for quickly coupling and decoupling the independent reader 102.

The converter 303 is configured to convert a standard connector 320, e.g., a connector without a power detector 300, to a connector with a power detector 300. The converter 303 provides a socket 322 that includes an alignment sleeve 323 for aligning a ferrule 321 of the standard connector 320 to the ferrule 308 of the converter 303. In one example embodiment, the standard connector 320 is an LC connector. In another example embodiment, the standard connector 320 is an SC connector. The converter 303 may be configured to interface with other types of connectors without departing from the spirit or scope of the disclosure. In the context of the converter 303, the type of optical fiber used as the section of optical fiber 304 preferably matches the type of optical fiber used in the standard connector. Alternatively, the converter 303 may further be used as an attenuator to alter the transmission of light by comprising an optical fiber material different from that used in the standard connector 320.

Figure 4:
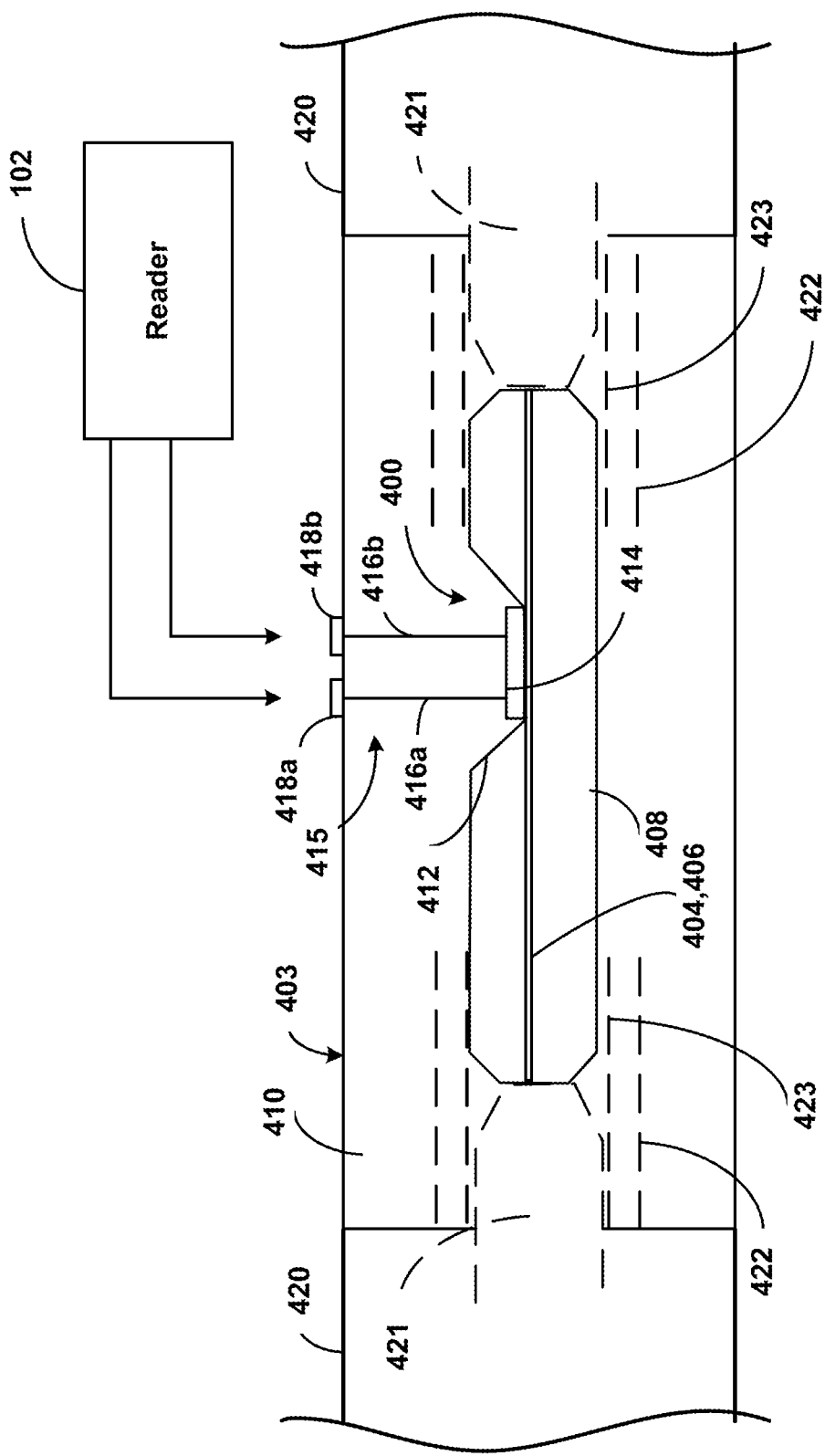
FIG. 4 is a schematic of an example embodiment of a ferrule-based optical power detector and reader in an adapter configuration.

FIG. 4 provides an example embodiment of a ferrule-based optical power detector 400 and the reader 102 in an adapter 403 configuration. The detector 400 generally comprises a section of optical fiber 404, which is independent from an optical fiber cable, a double-ended ferrule 408, a housing 410, a photodetector 414, and an electrical interface 415. The optical fiber 404 includes optical cladding 406 about an optical core (not shown). The ferrule 408 substantially surrounds the optical fiber 404 and the housing 410 is provided about the ferrule.

A cavity 412, or groove, is etched or otherwise fabricated within the ferrule 408 to expose a portion of the cladding 406. Seated within the cavity 412, over the exposed portion of the cladding 406, is the photodetector 414. In one example embodiment, the photodetector 414 comprises a positive-intrinsic-negative (PIN) photodiode. The photodetector 414 is fixedly secured within the cavity 412 in a position substantially parallel to the axis of the section of the optical fiber 404 and is configured to be electrically coupled to the reader 102 (see FIG. 2 and description above) via an electrical interface 415. In one example embodiment, the electrical interface 415 comprises a pair of electrical leads 416*a* and 416*b* extending from the photodetector 414 to contacts 418*a* and 418*b* on the outside of the housing 410.

The adapter 403 is configured to provide optical power detection at a point where two standard connectors 420 are joined, e.g., a patch panel. The adapter 403 provides a socket 422 at each end. The socket 422 includes an alignment sleeve 423 for aligning a ferrule 421 of the standard connector 420 to the ferrule 408 of the adapter 403. The standard connectors 420, e.g., connectors without a power detector 400, may comprise, for example, LC connectors or SC connectors. The adaptor 403 may be configured to interface with other types of connectors without departing from the spirit or scope of the disclosure. In the context of the adapter 403, the type of optical fiber used as the section of optical fiber 404 preferably matches the type of optical fiber used in the standard connectors 420. Alternatively, the adapter 403 may further be used as an attenuator to alter the transmission of light by comprising an optical fiber material different from that used in the standard connector 420. Note that in comparison to standard adapters, adapter 403 may be lengthened to accommodate the detector 400.

Figure 5A:
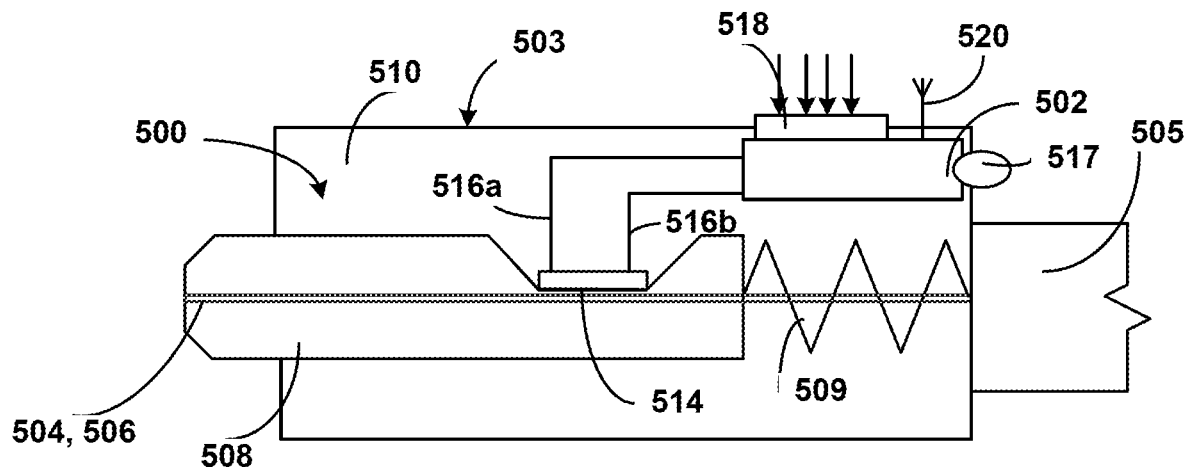
FIGS. 5A-5B are schematics of an example embodiment of an active ferrule-based optical power detector and reader.
Figure 5B:
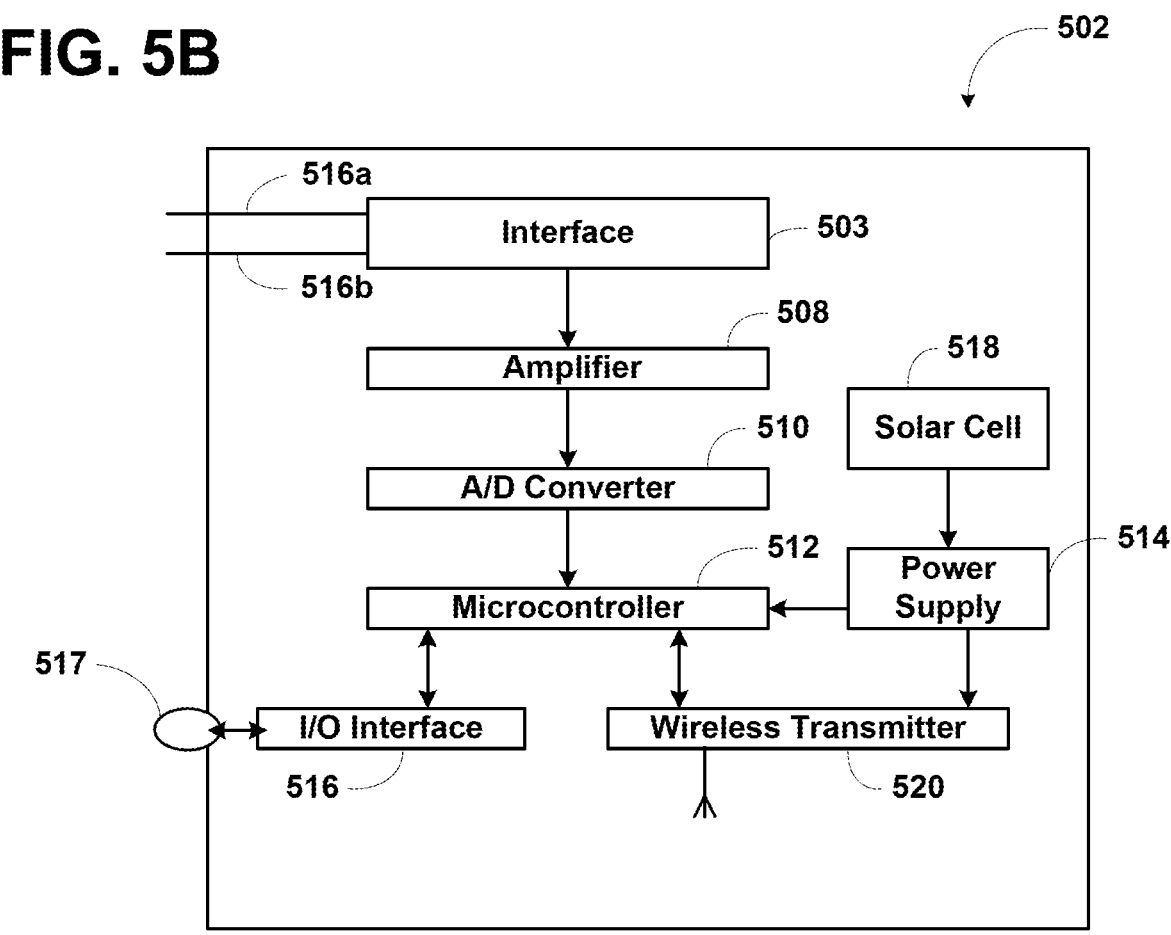

While the above, described embodiments of optical power detectors may be deemed passive, e.g., they require coupling with the reader to become active, FIGS. 5A-5B illustrate an active embodiment of a ferrule-based optical power detector 500 and a reader 502. The power detector 500 and reader 502 are shown in the context of a connector 503 but may be equally implemented in a converter or adapter context.

Similar to the embodiments described above, the detector 500 generally comprises an optical fiber 504, a ferrule 508, a housing 510, a photodetector 514, and an electrical interface 515. As shown, the optical fiber 504, which extends from an optical fiber cable 505, includes optical cladding 506 about an optical core (not shown). The ferrule 508, which is biased by a spring 509, surrounds the cladding 506. The housing 510 is provided about the ferrule 508. In one example embodiment, the housing 510 comprises a connector body of an LC connector. In another example embodiment, the housing 510 comprises a connector body and release sleeve of an SC connector. Other housing configurations may be used without departing from the spirit or scope of the disclosure.

A cavity 512, or groove, is etched or otherwise fabricated within the ferrule 508 to expose a portion of the cladding 506. Seated within the cavity 512, over the exposed portion of the cladding 506, is the photodetector 514. In one example embodiment, the photodetector 514 comprises a positive-intrinsic-negative (PIN) photodiode. The photodetector 514 is fixedly secured within the cavity 512 in a position substantially parallel to the axis of the optical fiber 504 and is configured to be electrically coupled to the reader 502 via an electrical interface 515. In one example embodiment, the electrical interface 515 comprises a pair of electrical leads 516*a* and 516*b* extending from the photodetector 514 to the reader 502. In another example embodiment, the electrical leads 516*a*, 516*b* are provided with slack to accommodate the motion of the biasing spring 509.

In contrast to the embodiments previously described, the elements of the reader 102 are not contained in an apparatus independent from the detector 500 but are configured as a system-on-a-chip (SOC) reader 502 and incorporated into the housing 510. The reader 502, shown in further detail in FIG. 5B, generally includes an electrical interface 503, an amplifier 508, an analog-to-digital (A/D) converter 510, a microcontroller 512, a power supply 514, an I/O interface 516 and a wireless transmitter (or transceiver) 520. The electrical interface 502 enables the reader 502 to be electrically coupled to the photodetector 514. The output of the photodetector 514 is received through the electrical interface 502 and is provided to the amplifier 508.

The amplifier 508 boosts the output signal from the photodetector 514 to a more usable level. In one example embodiment, the amplifier 508 comprises a transimpedance amplifier that is configured to boost the signal from the photodetector 514 and convert the photodetector's current output to a voltage. The analog output signal from the amplifier 508 is provided to the A/D converter 510, which converts the analog signal to a binary signal for submission to the microcontroller 512.

The power supply 514 comprises a battery that is charged with energy harvested by a solar cell 518 mounted on an external surface of the housing 510. The solar cell 518 is able to harvest sufficient energy such that the power supply 514 is able to power the microcontroller 512, the photodetector 514, the wireless transmitter 520, as well as any outputs activated by the microcontroller 512 via the I/O interface 516. The outputs may include, but are not limited to, an LED indicator (e.g., LED 517), an LCD display indicator or other type of indicator capable of indicating power in the optical fiber 504. The wireless transmitter 520, under direction of the microcontroller 512, is configured to transmit data related to the power detected at the optical fiber 504. The wireless transmissions may be in any known wireless technology but are particularly suited to short-range, low-power, low-maintenance, personal area networks like Bluetooth low energy (BLE), ZigBee, ANT, etc. that support Internet-of-Things (IoT) devices.

In one example embodiment, the wireless transmission is configured from the reader 502 in the connector 503 to contain a unique identification (ID) code derived from a barcode attached to the optical connector, converter, adapter or cable thereby giving each optical cable a unique identification. The unique ID code and barcode are paired, and the resulting paired data is stored in firmware of the microcontroller 512 at the time of manufacture of the detector 500 and reader 502. Accordingly, subsequent transmissions from the wireless transmitter 520 include the ID code, barcode, and/or paired data for identification purposes and may additionally include other pertinent data such as the highest, lowest, and/or current sensor measurement, power levels, optical transmission wavelength, and/or direction of optical transmission at the optical fiber 504. The wireless transmissions may be received by a corresponding data receiver, e.g., central computer, laptop computer, tablet, mobile device, etc.

Figure 5C:
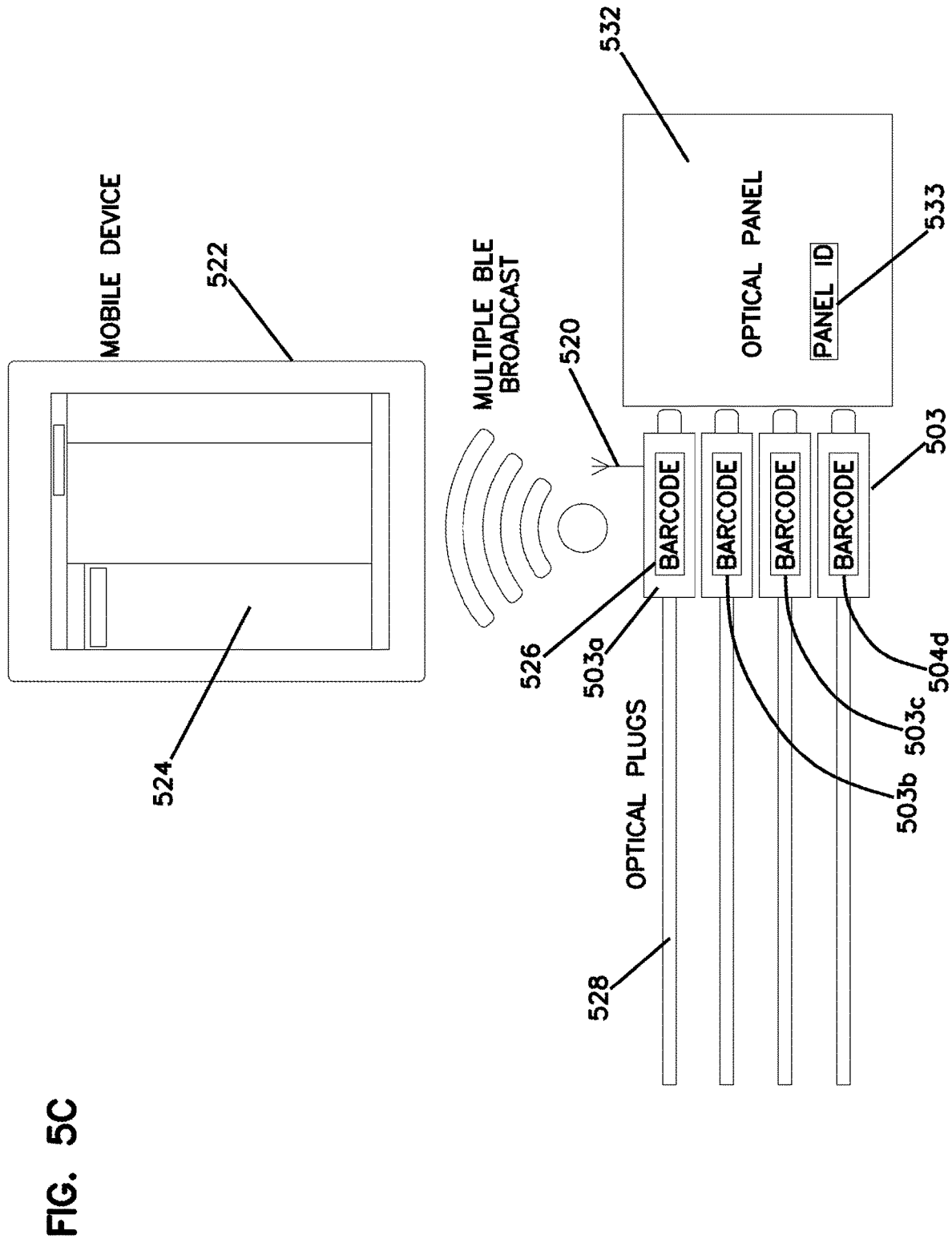
FIG. 5C is a schematic of the active ferrule-based optical power detector and reader working in conjunction with a mobile wireless device.

In another example embodiment, see FIG. 5C, a mobile device 522 is configured to use a software application 524 to pair the unique ID code of the transmitter 520 to a barcode 526 affixed to each connector 503 (or converter, or adapter). Upon pairing, the operator is able to view on the mobile device 522 any data coming from the specific, paired connector 503a while ignoring broadcasts from adjacent connectors 503b, 503c, and 503d; a convenience in the environment of a high density patch panel 532. In still another example embodiment, upon pairing, the software application 524 is configured to automatically open a display page, via the software app 524, to display detector 500/reader 502 data in near real time. In still another example embodiment, the unique ID code of the transmitter and the barcode 526, can be additionally paired to a panel identifier 533 on the patch panel 532

The ferrule-based optical power detector 500 and a reader 502 are suitable for numerous applications but are especially suited to applications where optical cables are secured in cabinets, e.g. a dark environment containing high density patch panels, for an extended period of time. The dark environment prevents energy harvesting by the solar cell 518 and maintains the detector 500 and the reader 502 in a substantially zero energy usage, sleep mode. When the door to the cabinet is open, light is detected and harvested by the solar cell 518 enabling the detector 500 and reader 502 to "wake-up" for normal operation to provide a on/off indication of optical power or detailed information regarding power levels, transmission wavelength, and/or direction of optical transmission at the optical fiber 504.

Figure 6:
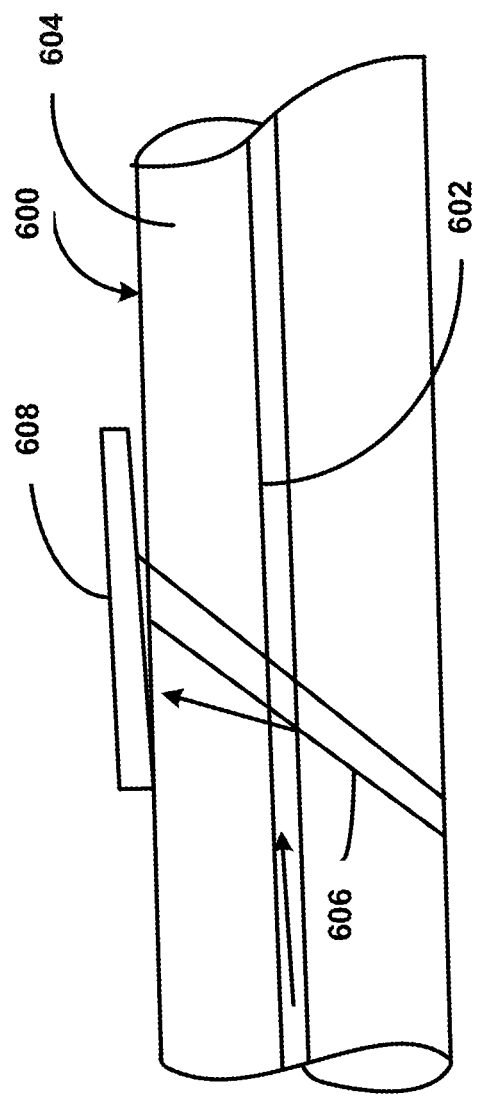
FIG. 6 is a schematic of an example embodiment of an optical fiber incorporating a mirror to reflect light into the optical power detector.

The embodiments described above have utilized a configuration wherein a portion of a ferrule is removed to expose a portion of underlying cladding from which a photodetector may detect optical energy lost into the cladding. An alternative embodiment, see FIG. 6, provides for a configuration wherein an optical fiber 600, including core 602 and cladding 604, further includes an area 606 having an index of refraction different from the optical fiber 600. The area 606, and its different index of refraction, is created by first masking the fiber 600 to define the area. The area is then exposed, at an angle, to a UV light. The resulting area 606 is at an angle to the core 602 whereby a weakly reflecting dielectric mirror is established. The mirror reflects optical energy to a photodetector 608, whose signal can be transmitted to a reader, e.g., reader 102. Thus, the detector detects reflected light rather than the light lost into the cladding. The mirror can be alternatively, or additionally, created by writing a tilted fiber Bragg grating in the fiber. The Bragg grating comprises many closely spaced changes in the index of refraction made with UV light exposure on a photosensitive optical fiber. The Bragg grating forms a dielectric mirror in this application.

In some of the embodiments described above, energy harvesting is used to power the components of the detector and reader, e.g., detector 500 and reader 502. In an example embodiment described above, light energy is harvested by a solar cell to charge a battery. However, it should be noted that other types of energy may be harvested and used to power the components of the detector and reader without departing from the spirit or scope of the disclosure. For example, mechanical, thermal, and kinetic energy may be harvested.

Figure 7:
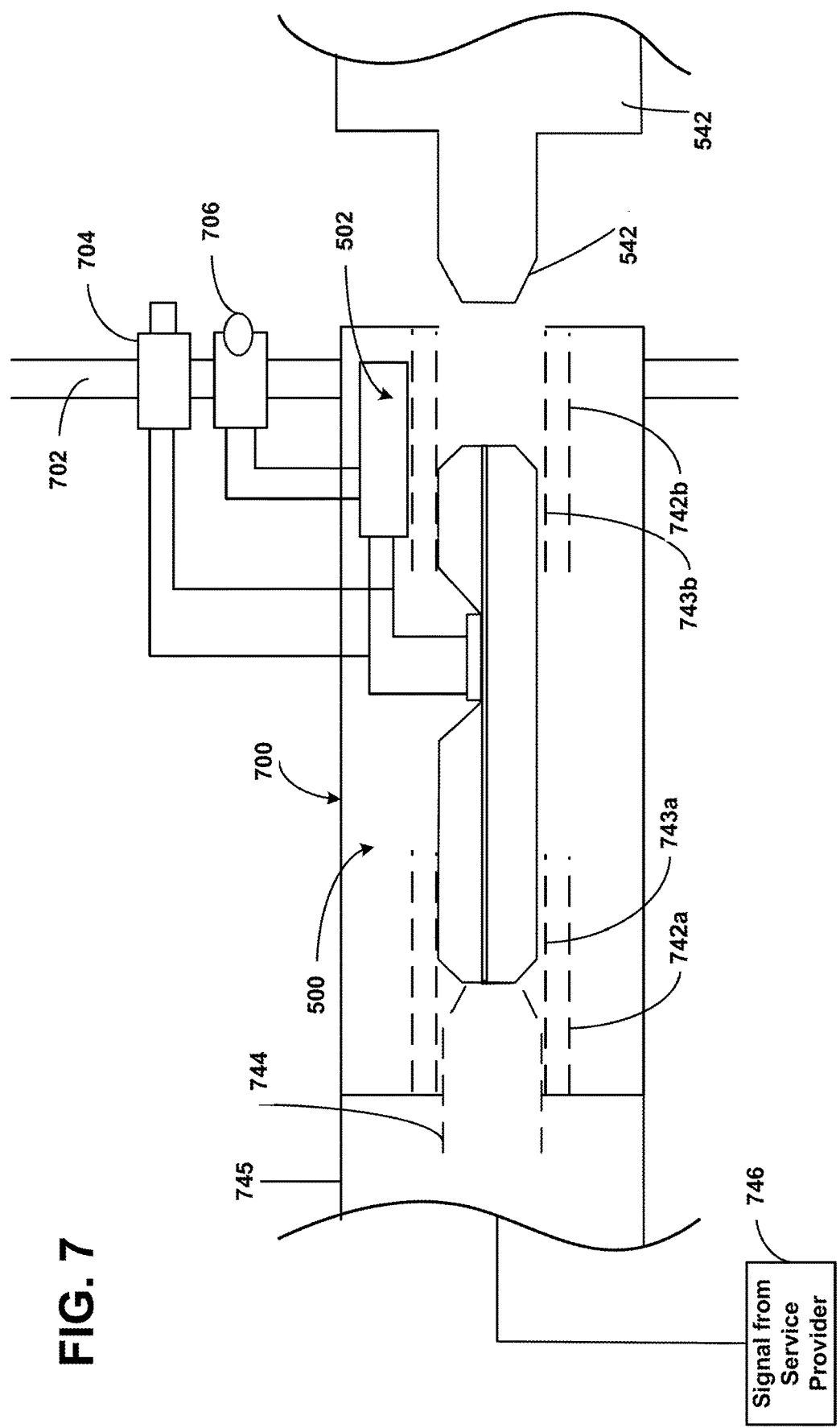
FIG. 7 is a schematic of a push button energy harvesting device configured to power the optical power detector and reader.

FIG. 7 illustrates a pushbutton energy harvesting device that may replace the solar cell of FIG. 5 As shown in FIG. 7, the detector and reader of FIG. 5 are incorporated into an adapter 700 configuration. The adapter 700 is provided with a socket 742a, 742b at each end, with each socket including an alignment sleeve 743a, 743b. The alignment sleeve 743a of socket 742a serves to align the ferrule 744 of the connector 745 that provides an optical signal from a service provider 746. The alignment sleeve 743b of socket 742b serves to align the ferrule 747 of a connector 748 that is coupled to, for example, an in-home fiber optic network. The adapter 700 is mounted at a receptacle 702, e.g., a wall receptacle one might find in a home setting, and an energy harvesting push button switch 704 is positioned at or near the receptacle 702 such that the energy produced by the switch 704 may be fed to the detector 500 and reader. For example, the push button switch 704 may be provided on a wall panel, a faceplate, or a wall-mounted enclosure. Accordingly, in a scenario where a homeowner wishes test for power at the adapter 700, the homeowner may depress the pushbutton switch 704. In doing so, sufficient mechanical energy is harvested from movement of the switch 704 such that the detector 500 and reader 502 may be powered by the harvested energy to sense optical power and provide a simple on/off indication, e.g. the lighting/non-lighting of an LED 706 (which may be located proximate the pushbutton switch 704 on a panel, faceplate, or wall-mounted enclosure). Additional information about energy harvesting push buttons may be found in U.S. Patent Application Publication US20150084440, which is hereby incorporated by reference in its entirety.

Figure 8:
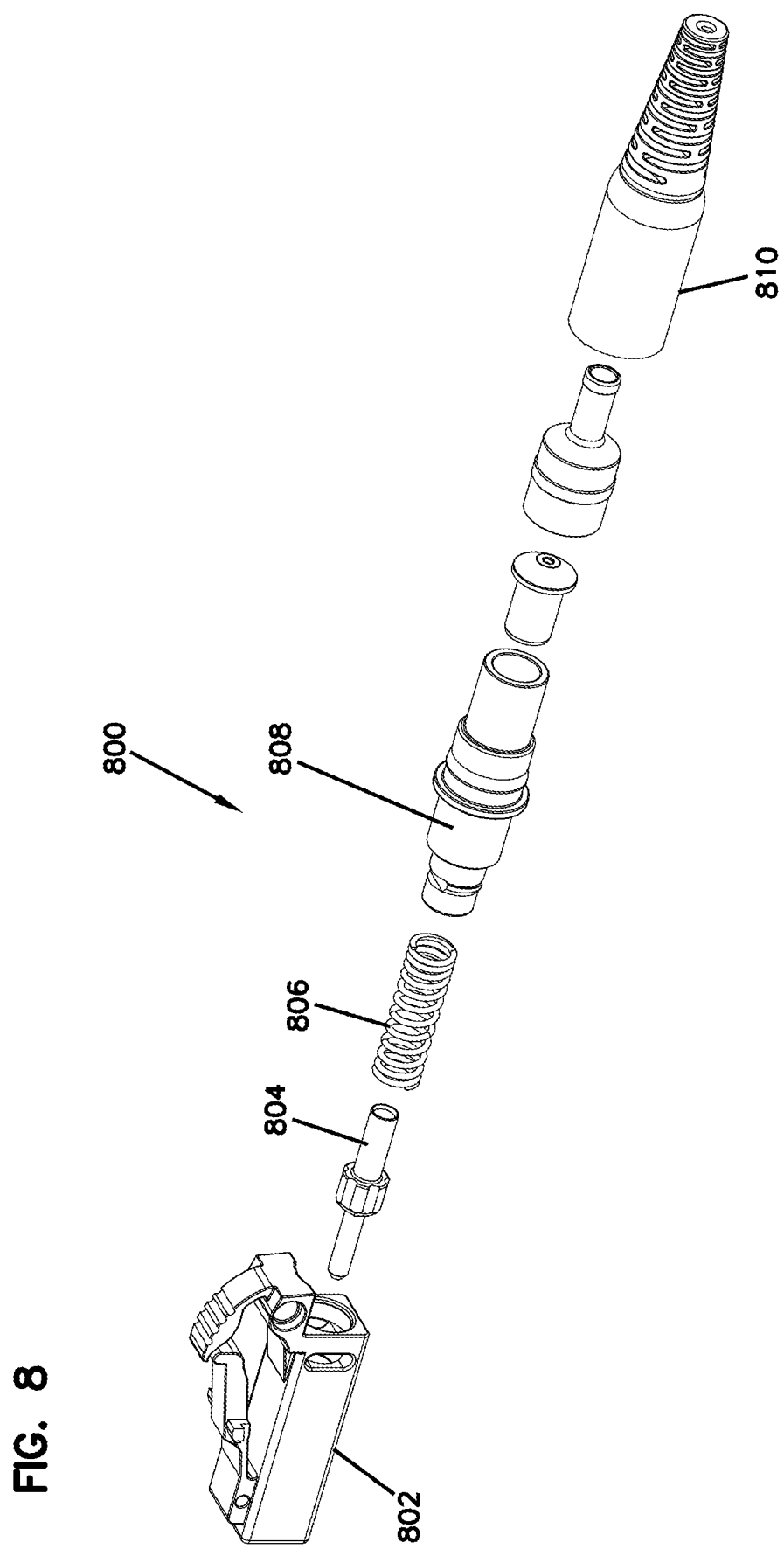
FIG. 8 is an exploded view of an LC connector.

FIG. 8 provides an exploded view of an LC connector 800. The housing of the LC connector generally comprises the plug body 802, the rear body 808, the boot 326. These housing elements comprise elements to which the contacts, e.g., contacts 118a, 118b, contacts 318a, 318b, or contacts 418a, 418b, of the detector 100, 300, or 400 may be fixed. FIG. 8 also illustrates the ferrule 804 and the biasing spring 806 of the LC connector.

Figure 9:
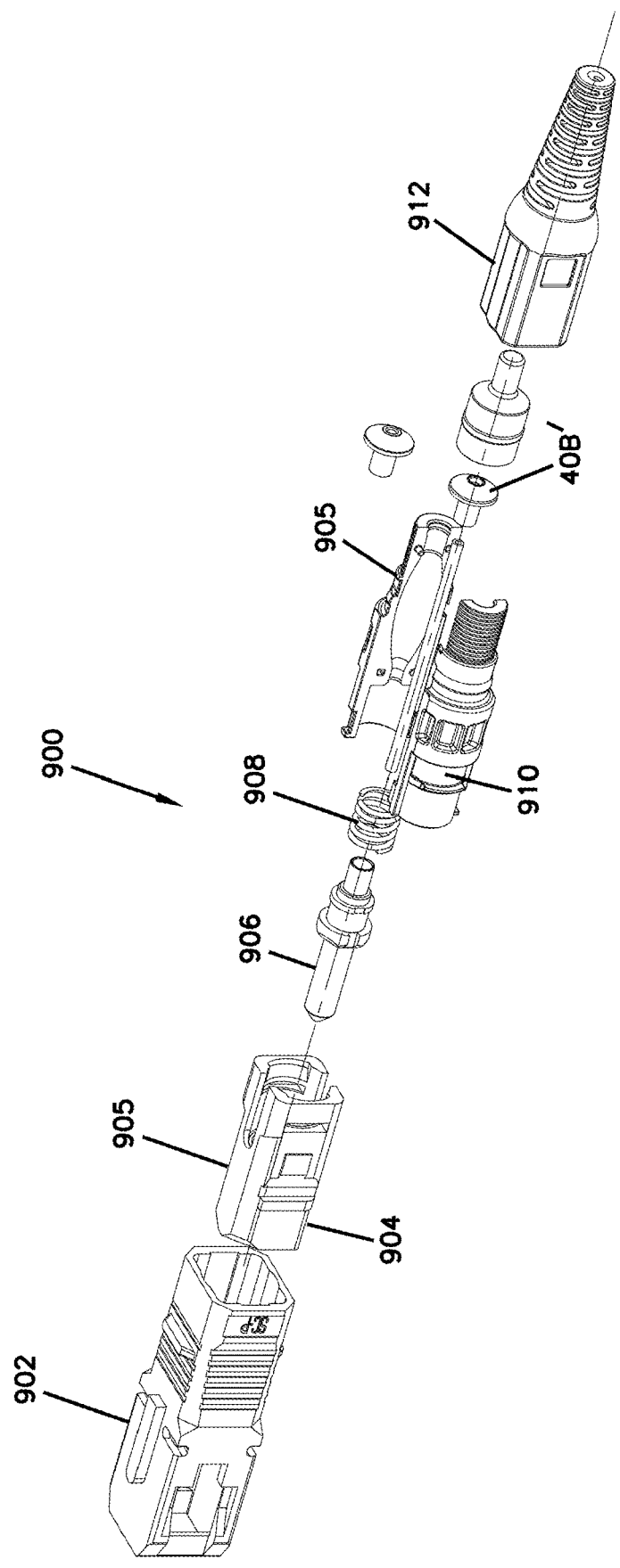
FIG. 9 is an exploded view of an SC connector.

FIG. 9 provides an exploded view of an SC connector 900. The housing of the SC connector generally comprises the release sleeve 902, the connector body 905, which comprises the plug body 904 and the rear body 910, and the boot 912. These housing elements comprise elements to which the contacts, e.g., contacts 118a, 118b, contacts 318a, 318b, or contacts 418a, 418b, of the detector 100, 300, or 400 may be fixed. The release sleeve 902 is configured to slide a limited range relative to the plug body 904. The plug body 904 is configured to house the ferrule 906 and the spring 908. The rear body 910 mates with the rear end of the plug body 904 and operates to maintain the ferrule 906 and the spring 908 within the plug body 904.

Further details regarding the LC and SC connectors illustrated in FIGS. 8 and 9, respectively, may be found in U.S. Pat. No. 8,636,425, which is hereby incorporated by reference in its entirety.

Figure 10:
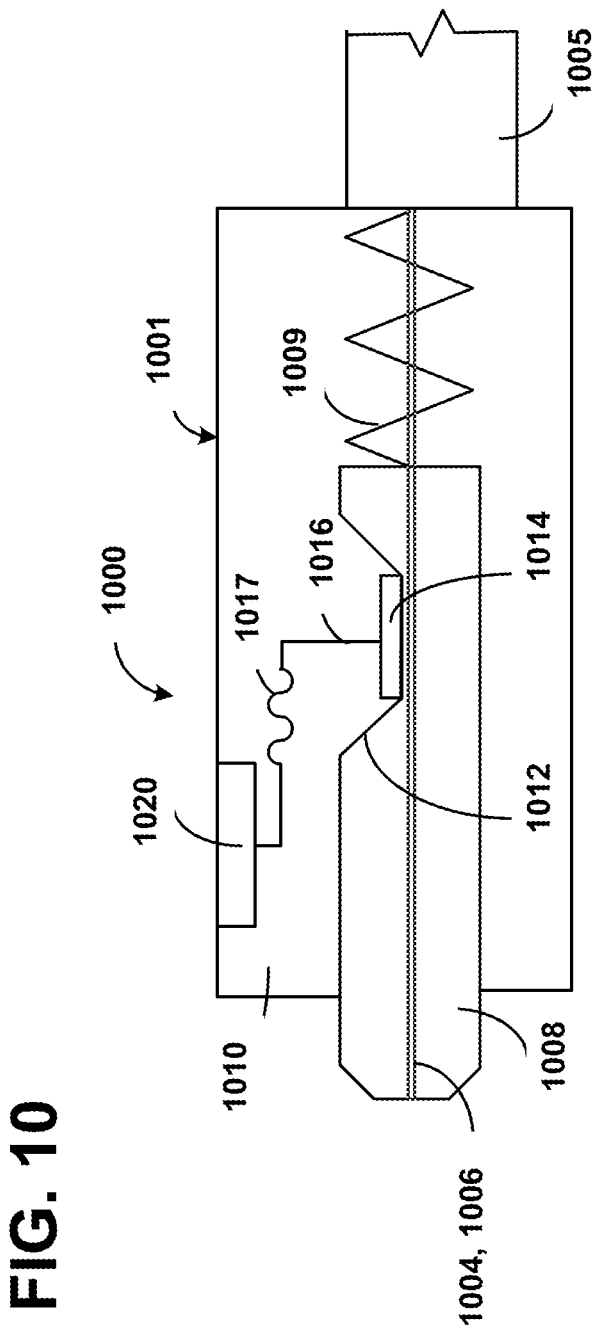
FIG. 10 is a schematic of an example embodiment of a ferrule-based optical power detector.
Figure 11:
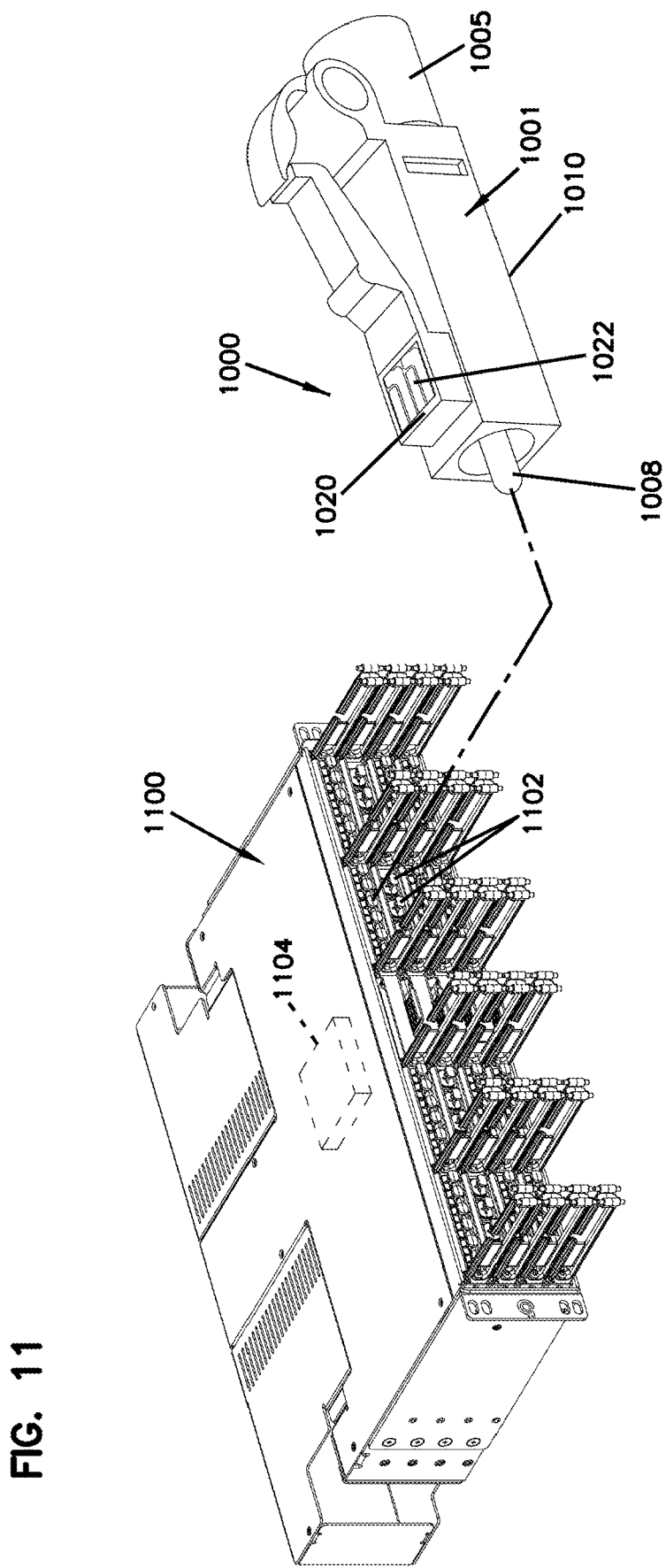
FIG. 11 is a schematic of an example embodiment of a ferrule-based optical power detector and a managed connectivity panel.

FIGS. 10 and 11 illustrate an example embodiment of an active ferrule-based optical power detector 1000 that is configured to be implemented in a managed connectivity system, such as the Quareo Physical Layer Management System available from TE Connectivity of Berwyn, Pa. The power detector 1000 may be implemented in a connector, converter or adapter context, as described above. In this configuration, the power detector 1000 is implemented in a connector 1001 configuration, and generally comprises an optical fiber 1004, a ferrule 1008, a housing 1010, a photodetector 1014, and a processing device 1020, e.g., a microcontroller. As shown, the optical fiber 1004, which extends from an optical fiber cable 1005, includes optical cladding 1006 about an optical core. The ferrule 1008 surrounds the cladding 1006 and is biased in a forward direction by a spring 1009, which allows the ferrule 1008 to move relative to the housing 1010 along a longitudinal axis. The housing 1010 is provided about the ferrule 1008. Embedded within the housing 1010 is the processing device. In one example embodiment, the housing 1010 comprises a connector body of an LC connector. In another example embodiment, the housing 1010 comprises a connector body and release sleeve of an SC connector. Other housing configurations may be used without departing from the spirit or scope of the disclosure. The processing device 1020 can be in die form in an off-the-shelf configuration or can comprise a proprietary application specific microcontroller (ASup) design. In one example embodiment, the processing device 1020 is configured to emulate the operation of a Quareo connector EEPROM.

A cavity 1012, or groove, is etched or otherwise fabricated (e.g., mirror or grating) within the ferrule 1008 to expose a portion of the cladding 1006. Seated within the cavity 1012, over the exposed portion of the cladding 1006, is the photodetector 1014. In one example embodiment, the photodetector 1014 comprises a positive-intrinsic-negative (PIN) photodiode that is used to detect optical energy. Alternatively, other types of sensors may be used within the ferrule 1008 to detect other types of physical energy and produce a usable output signal representative of that physical energy. However, in the context of the photodetector embodiment, the photodetector 1014 is fixedly secured within the cavity 1012 in a position substantially parallel to the axis of the optical fiber 1004. The output of the photodetector 1014 is electrically coupled to an I/O line of the processing device via one or more electrical leads 1016; the output of the photodetector 1014 may be analog or digital depending on the photodetector selected. In one example embodiment, the one or more electrical leads 1016 are provided with slack 1017 to accommodate the motion of the ferrule 1008 as it travels longitudinally. The slack 1017 may, alternatively, be replaced with springs, slides or any type of electrical connection that would accommodate movement between the ferrule 1008 and the housing 1010.

Referring to FIG. 11, the processing device is provided with electrical contacts 1022 for mating with a managed connectivity panel, for example the Quareo Q3000 managed connectivity panel 1100. In the example embodiment, the managed connectivity panel 1100 includes a plurality of connectors 1102 wherein each is configured to receive the connector 1001 with the power detector 1000 embedded therein. In one example embodiment, the managed connectivity panel 1100 includes a panel controller 1104 which is configured to read and write to the processing device 1020. Accordingly, communication between the panel controller 1104 and the embedded processing device 1020 can occur to transfer managed connectivity information, e.g., read/write data stored in a key-length-value (KLV) structure, as well as determine that optical power is present at the connector 1001. In some embodiments, the processing device 1020 or panel controller 1104 can use the output of the power detector 1000 to calculate a power level. Further, the panel controller 1104 can use the optical power information to create a physical and optical connectivity map to pinpoint locations with and/or without optical power. The panel controller 1104 may additionally be configured to generate alerts when optical power is either detected or lost as determined by the power detector 1000. In one example embodiment, the power detector 1000 is provided at each end of an optical fiber cable to monitor the optical power at each end of the cable.

Figure 12:
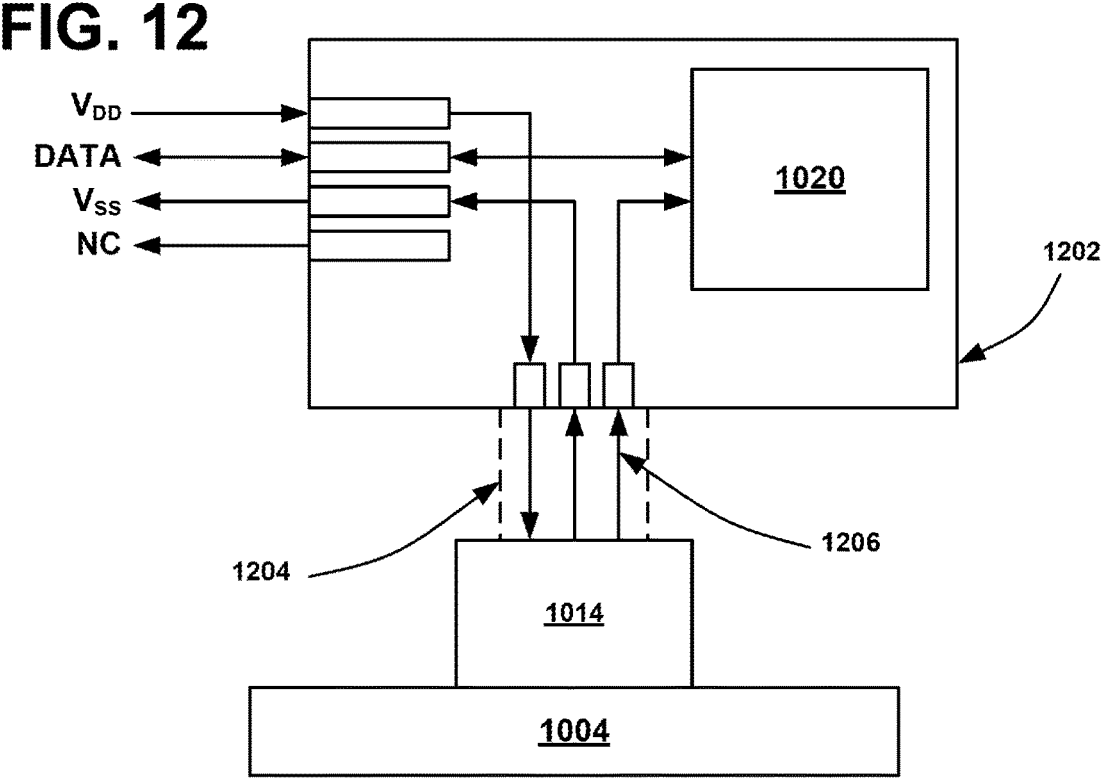
FIGS. 12-15 are example electrical schematics of a power detector.

FIGS. 12-15 illustrate various electrical configurations for the power detector 1000 housed within connector 1001. FIG. 12 illustrates an example embodiment of a four-contact configuration 1200, which is a configuration that may be used with the Quareo Physical Layer Management System described above. As shown, the electrical configuration 1200 includes the photodetector 1014, proximate the optical fiber 1004, coupled to a substrate assembly 1202 incorporating the processing device 1020. The photodetector 1014 is coupled to the substrate assembly 1202 with a micro ribbon cable 1204 (or printed interconnector) that includes a sensor line 1206. The substrate assembly 1202 is additionally provided with four contacts: (1) NC (not connected); (2) Vss (negative supply voltage); (3) Data; and (4) Vdd (positive supply voltage). The four contacts are configured to mate with connectors, e.g., connectors 1102, in the managed connectivity panel, e.g. panel 1100.

Figure 13:
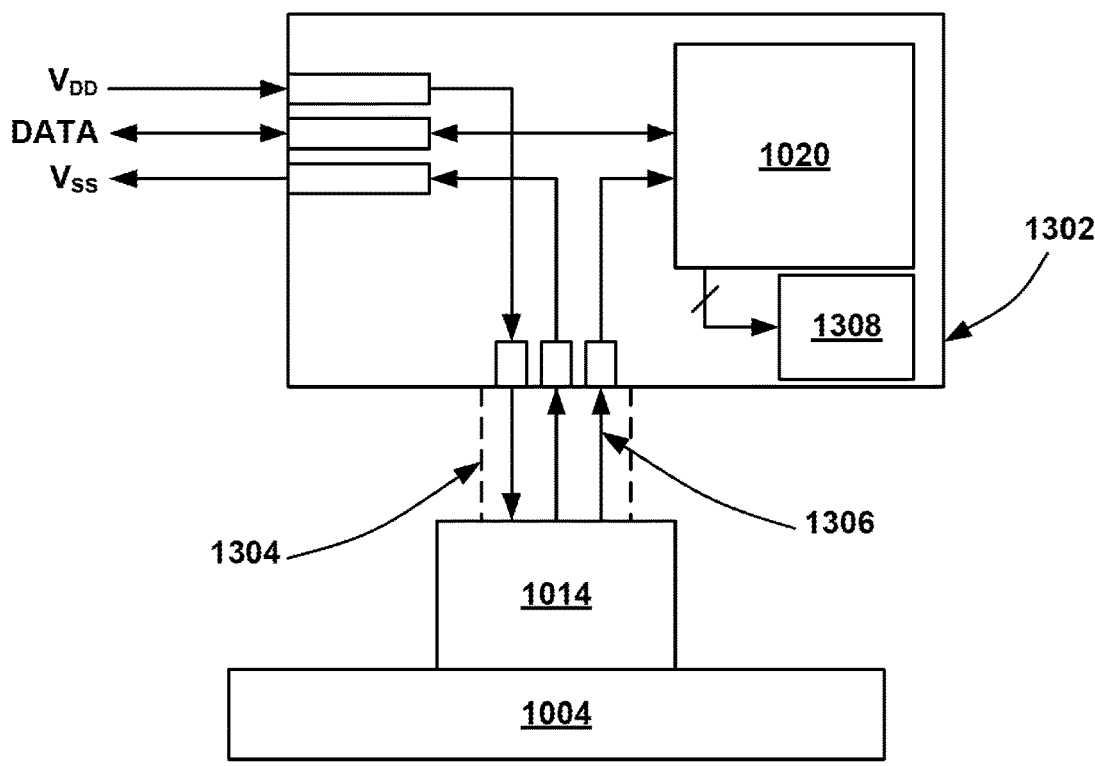

FIG. 13 illustrates an example embodiment of a three-contact configuration 1300 for the power detector 1000, which can be used with other types of managed connectivity systems. As shown, the electrical configuration 1300 includes the photodetector 1014, proximate the optical fiber 1004, coupled to a substrate assembly 1302 incorporating the processing device 1020. The photodetector 1014 is coupled to the substrate assembly 1302 with a micro ribbon cable 1304 (or printed interconnector) that includes a sensor line 1306. The substrate assembly 1302 is provided with three contacts: (1) Vss (negative supply voltage); (2) Data; and (3) Vdd (positive supply voltage). The substrate assembly 1302 further includes one or more light emitting diodes (LEDs) 1308, e.g., a tri-color LED. The LEDs 1308 are visible at the connector 1001 and can provide the installer a visual indicator as to the presence or absence of power. In another embodiment, the LEDs 1308 use different colors to indicator different levels of power, e.g., green—to indicates high power, yellow—to indicate nominal power, and red—to indicate low power (or simply power detected); the lack of light at the LEDs 1308 indicates no power detected.

Figure 14:
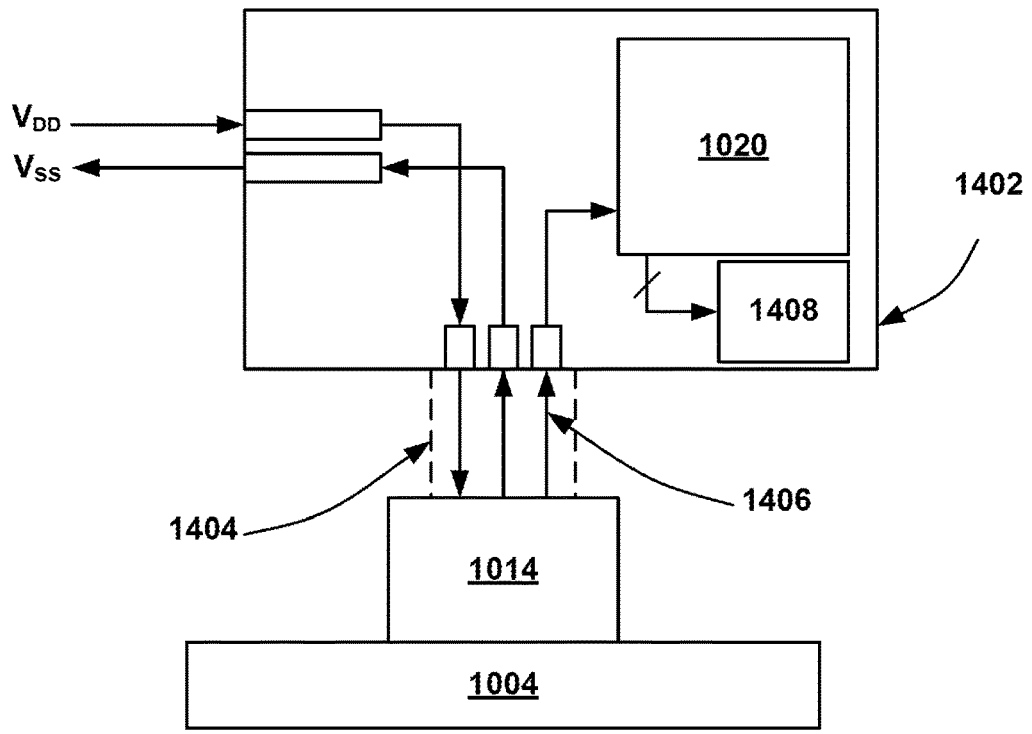

FIG. 14 illustrates an example embodiment of a two-contact configuration 1400 for the power detector 1000. As shown, the electrical configuration 1400 includes the photodetector 1014, proximate the optical fiber 1004, coupled to a substrate assembly 1402 incorporating the processing device 1020. The photodetector 1014 is coupled to the substrate assembly 1402 with a micro ribbon cable 1404 (or printed interconnector) that includes a sensor line 1406. The substrate assembly 1402 is provided with two contacts: (1) Vss (negative supply voltage); and (2) Vdd (positive supply voltage). The substrate assembly 1402 further includes one or more light emitting diodes (LEDs) 1408 similar to LEDs 1308 described above. The electrical configuration 1400 is configured to provide only power to the processing device, photodetector 1014, and LEDs 1408 by interfacing with, for example, special panel power or another power supply.

Figure 15:
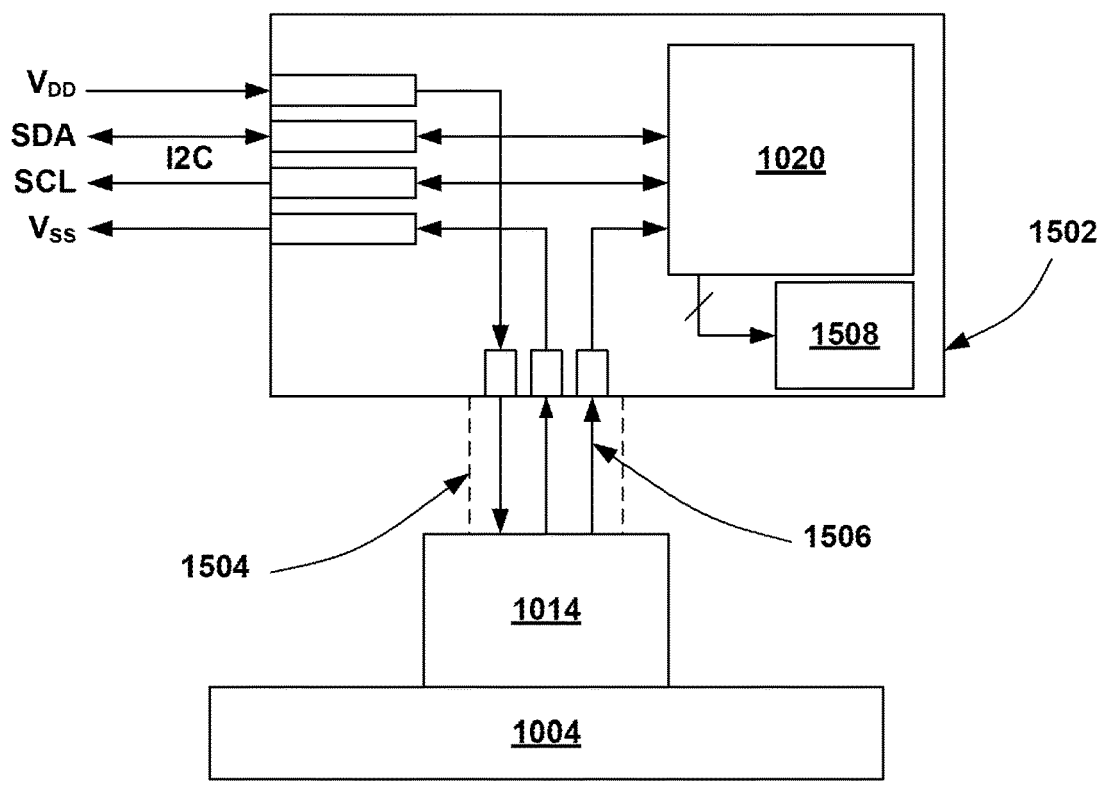

FIG. 15 illustrates an example embodiment of another four-contact configuration 1500 for the power detector 1000. As shown, the electrical configuration 1500 includes the photodetector 1014, proximate the optical fiber 1004, coupled to a substrate assembly 1502 incorporating the processing device 1020. The photodetector 1014 is coupled to the substrate assembly 1502 with a micro ribbon cable 1504 (or printed interconnector) that includes a sensor line 1506. The substrate assembly 1502 is provided with four contacts: (1) Vss (negative supply voltage); (2) SCL (clock signal); (3) SDA (data signal) and (4) Vdd (positive supply voltage). The SDA and SCL contacts enable I2C (inter-integrated circuit protocol) communication The substrate assembly 1502 further includes one or more light emitting diodes (LEDs) 1508 similar to LEDs 1308 described above.

Referring to FIG. 16A an example of a ferrule-less connector 1610 and an optical fiber 1604 extending there through is illustrated. The optical fiber 1604 extends from a fiber optic cable 1605. In certain examples, the optical fiber 1604 includes a bare fiber section 1606, e.g. a section of fiber comprising only a glass core and a glass cladding layer, and a coated section 1607, e.g., a section of fiber comprising the core, the cladding, a coating layer and a buffer layer. The connector 1610 comprises a main connector body 1620, a fiber positioning piece 1622, a fiber fixation component 1624, and a proximal connector body 1626. The ferrule-less connector 1610 can additionally include various other components such as a boot 1630 and a shutter 1632. It should be noted that FIG. 16A illustrates a buckling of the optical fiber 1604, such buckling occurs when the connector 1610 is coupled to another connector 1610; in an unconnected state, the optical fiber 1604 is straight, as illustrated by the dashed line in FIG. 16A, lying along a central axis of the connector 1610. Additional information regarding the ferrule-less connector 1610 can be found in U.S. provisional patent application No. 62/352,281, filed Jun. 20, 2016 and entitled "Ferrule-less Fiber Optic Connector;" the entire contents of the identified application is hereby incorporated by reference.

FIG. 16B illustrates the ferrule-less connector of FIG. 16A with the addition of an optical power detector 1600 and reader 1602. The power detector 1600 generally comprises the optical fiber 1604, the ferrule-less connector 1610, a photodetector 1614 and an electrical interface 1615. The photodetector 1614, e.g. a positive-intrinsic-negative (PIN) photodiode or other appropriate sensor, can be placed at one or more suitable locations within the ferrule-less connector 1610 to detect power from the bare fiber section 1606 of the optical fiber 1604; a portion of the bare fiber section 1606 proximate the photodetector 1614 has been modified to include a mirror or grating to direct light towards the photodetector 1614. For example, the photodetector 1614(a) is mounted on a surface of or embedded within the main connector body 1620, e.g., at the shutter 1632, proximate the exiting tip of the bare fiber section 1606. The photodetector 1614(b) is mounted on a surface of or embedded within the fiber positioning piece 1622, e.g., at the nose of the connector 1610, proximate the bare fiber section 1606. The photodetector 1614(c) is mounted centrally on a surface of or embedded within the main connector body 1620, e.g., at the buckling region, proximate the bare fiber section 1606. The photodetector 1614(d) is mounted on a surface of or embedded within the fiber fixation component 1624, e.g., the anchoring region, proximate the bare fiber section 1606. Other photodetector placements positioning the photodetector 1614 proximate the bare fiber section 1606 of the optical fiber 1604 within the ferrule-less connector 1610 are also possible. Each photodetector 1614 is provided with an electrical interface 1615, e.g., electrical leads 1616a and 1616b connecting the photodetector to electrical contacts 1617a and 1617b, respectively, enabling the reader 1602 to be electrically coupled to photodetector 1614. The reader 1602 can be either passive or active, see description of various reader configurations described above, as can the photodetector 1614.

In certain embodiments, the ferrule-less connector 1610 includes a base configuration that is operable as a connector without the photodetector 1614. Further, in certain embodiments, the base connector 1610 is configured to be modified enabling it for operation with the photodetector 1614. For example, a part, e.g. a connector shell, shutter, nose piece, etc., containing the photodetector 1614 can be added to the base connector. As such, a connector design can be used with or without the photodetector with minimal modifications and costs.

Figure 17B:
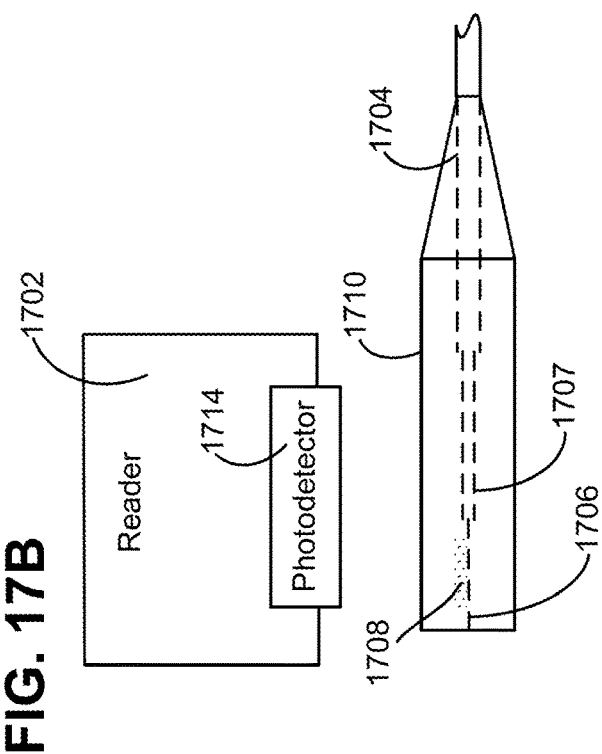
FIG. 17B is a side view schematic of FIG. 17A that additionally illustrates an optical power detector and reader.
Figure 17A:
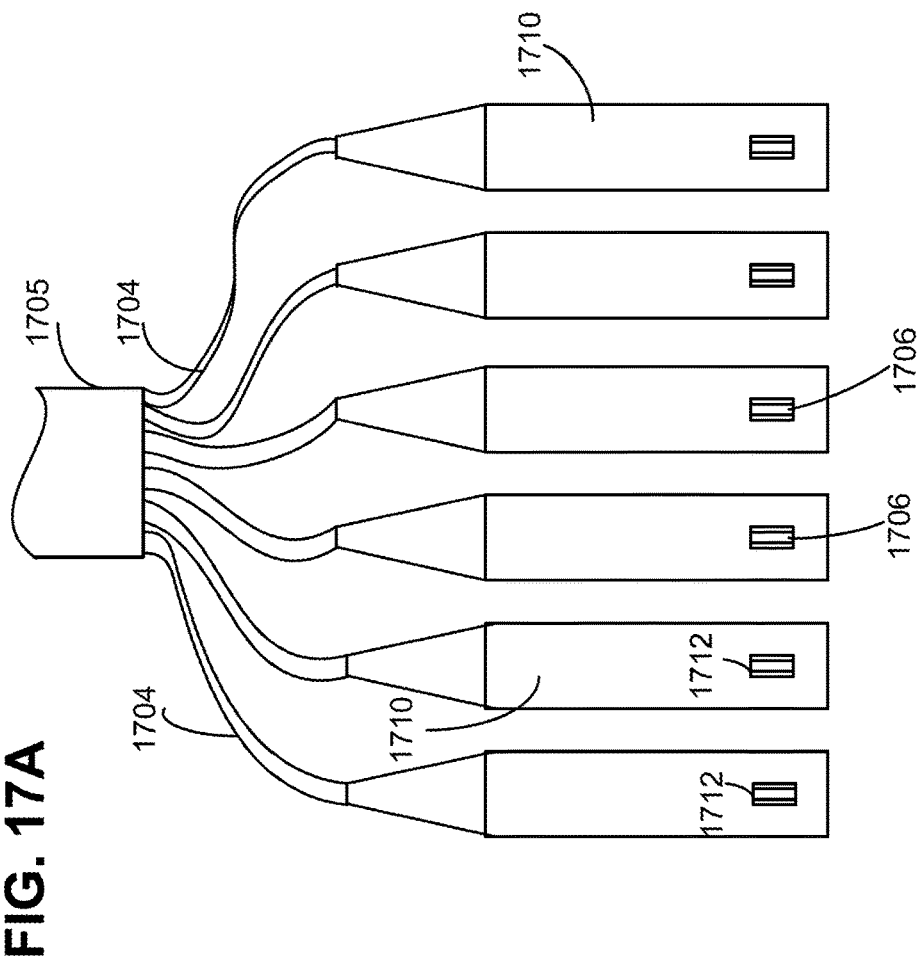
FIG. 17A is a top view schematic of a plurality of optical fibers and corresponding connectors that include an opening for optical power detection.

In each of the embodiments described above, a photodetector for detecting power within an optical fiber is integrated with an optical fiber ferrule, housing and/or connector. In the optical power detector and reader configuration of FIGS. 17A and 17B, the photodetector 1714 is located remotely from the fiber, ferrule, housing and/or connector, and can be incorporated into the reader 1702 itself or be positioned remotely there from; the reader 1702 can be fixed in position or mobile. In the configuration of FIGS. 17A and 17B, a multi-fiber cable 1705 includes a plurality of optical fibers 1704 with each of the optical fibers 1704 including at least a bare fiber section 1706; each of the optical fibers 1704 can additionally include a coated section 1707. A bare fiber end of each of the optical fibers 1704 is connectorized with a ferruled or ferrule-less connector 1710. Each connector 1710 includes an opening 1712 overlying a portion of the bare fiber section 1706 of the optical fiber 1704; the portion of the bare fiber section 1706 beneath the opening is modified to include a mirror or grating to deflect light toward the opening 1712. The opening 1712 can be vacant or filled with a transparent or translucent material, enabling the detection of light there through. In certain examples, the underlying bare fiber section 1706 of the optical fiber 1704 is additionally coated with a fluorescent material 1708, see FIG. 17B, that is activated by the light passing through the optical fiber 1704. The fluorescing properties of the material 1708 can enhance the ability of the photodetector 1714 to detect optical power in the optical fiber 1704. In certain examples, the photodetector 1714 and reader 1702 are configured to detect the power in any one of a plurality of optical fibers 1704 (ribbonized or individual fibers), e.g. the reader 1702 has the ability to simultaneously monitor all of the plurality of optical fibers and detect when light is present in one, or more, of the plurality. In certain examples, optical filters enable the detection and identification of light present in more than one of the plurality of optical fibers by the photodetector 1714 and reader 1720. For example, an optical filter specific to each optical fiber can alter the wavelength of the light detected enabling not only the detection of light but identification of the specific optical fiber from which the light is emitted. In certain examples, the photodetector 1714 comprises a plurality of photodetectors (e.g., a multi-detector) with each photodetector configured to detect light emitting from one or more optical fibers among a plurality of optical fibers. In certain examples, the photodetector 1714 and reader 1702 are configured to monitor only an independent single fiber and the light emitted therefrom.

Additional information about managed connectivity systems may be found in U.S. Pat. Nos. 9,140,859; 9,176,294; 8,690,593; 8,142,221; 9,020,319; 9,223,105; 9,198,320; 9,213,363; 8,923,013; 8,934,253; and 8,934,252, all of which are hereby incorporated by reference in their entirety.

Additional information about non-intrusive optical power monitoring may be found in PCT publications WO2015/121804 and WO2014/099457, both of which are hereby incorporated by reference in their entirety.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

Various modifications and additions can be made to the disclosed embodiments discussed above. Accordingly, the scope of the present disclosure should not be limited by the particular embodiments described above, but should be defined only by the claims set forth below and equivalents thereof.

What is claimed is:

1. An optical power detection system comprising:
    an optical fiber connector having a singular housing, the singular housing having a first end coupled to an optical fiber cable, which has singular optical fiber within, and a second end presenting an exposed end of the singular optical fiber and presenting an optical communications coupling interface, the exposed end of the singular optical fiber being supported within the singular housing by a ferrule, the ferrule including a cavity to expose a portion of a cladding surrounding a core of the optical fiber;
    a sensor positioned within the cavity of the ferrule proximate the cladding of the singular optical fiber, the sensor detecting light emitted within the optical fiber connector singular housing by the optical fiber and producing a sensor output representative of the detected light; and
    a processing device embedded within the optical fiber connector singular housing, the processing device electrically coupled to the sensor and configured to receive the sensor output, the processing device further configured to operate on the sensor output to generate a processor output representative of the detected light, the processor output transmitted through a plurality of contacts positioned on an exterior surface of the optical fiber singular housing.

2. The system of claim 1, wherein the processing device is configured to interface with a managed connectivity system, the managed connectivity system configured to monitor the sensor output.

3. The system of claim 2, wherein the managed connectivity system is configured to monitor the sensor output of a plurality of sensors, each of the plurality of sensors protected by a respective optical fiber connector and to generate an optical connectivity map based on the sensor output of the plurality of sensors.

4. The system of claim 2, wherein the processing device is configured to interface with the managed connectivity system via the plurality of electrical contacts.

5. The system of claim 1, wherein the plurality of electrical contacts comprises two, three or four electrical contacts.

6. The system of claim 5, wherein the four electrical contacts enable data communication between the processing device and the managed connectivity system.

7. The system of claim 1, wherein the singular housing of the optical fiber connector includes an LED and wherein the processor output is configured to activate or de-activate the LED to provide a corresponding indication of the presence or absence of detected light.

8. The system of claim 1, wherein the singular housing of the optical fiber connector includes a tri-color LED and wherein the processor output is configured to activate the tri-color LED, wherein each of the three different colors of the LED corresponds to a different level of detected light.

9. The system of claim 1, wherein the sensor is positioned in an orientation that is parallel to an elongate axis of the optical fiber.

10. The system of claim 1, wherein the sensor comprises a photodiode.

11. The system of claim 10, wherein the photodiode comprises a positive-intrinsic-negative (PIN) photodiode.

* * * * *